United States Patent
Sako et al.

(10) Patent No.: US 8,473,544 B2
(45) Date of Patent: Jun. 25, 2013

(54) IMAGE DISPLAY SYSTEM, DISPLAY APPARATUS, AND DISPLAY METHOD

(75) Inventors: Yoichiro Sako, Tokyo (JP); Keiji Kimura, Tokyo (JP); Masaaki Tsuruta, Tokyo (JP); Masamichi Asukai, Kanagawa (JP); Taiji Ito, Kanagawa (JP); Nozomu Ozaki, Kanagawa (JP); Akinobu Sugino, Kanagawa (JP); Hidehiko Sekizawa, Tokyo (JP); Yonetaro Totsuka, Chiba (JP)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 12/312,615

(22) PCT Filed: Nov. 5, 2007

(86) PCT No.: PCT/JP2007/071491
§ 371 (c)(1),
(2), (4) Date: May 19, 2009

(87) PCT Pub. No.: WO2008/068990
PCT Pub. Date: Jun. 12, 2008

(65) Prior Publication Data
US 2010/0063997 A1    Mar. 11, 2010

(30) Foreign Application Priority Data

Dec. 7, 2006    (JP) ................. 2006-330832

(51) Int. Cl.
*G06F 15/16*    (2006.01)
(52) U.S. Cl.
USPC ........................................................ 709/203
(58) Field of Classification Search
USPC .................... 709/203, 217; 707/769
See application file for complete search history.

(56) References Cited

U.S. PATENT DOCUMENTS 6,717,737 B1 * 4/2004 Haglund ................. 359/631
7,254,482 B2    8/2007 Kawasaki et al.
(Continued)

FOREIGN PATENT DOCUMENTS

EP    1173014 A1    1/2002
EP    1 324 274 A2    7/2003
(Continued)

OTHER PUBLICATIONS

Daisuke, Kamisaka et al., "NAMBA Explorer: The Real-time City Area Information Sharing System which can Share Pictures", Information Processing Society of Japan, Jan. 30, 2004, Vol. No. 9, pp. 49-54.

(Continued)

*Primary Examiner* — Jason Recek
(74) *Attorney, Agent, or Firm* — Wolf, Greenfield & Sacks, P.C.

(57) ABSTRACT

If a user specifies a location on a map image, he or she can see an image shot at that location. An imaging apparatus (an imaging/display apparatus 1 or an imaging apparatus 30) placed on a movable body transmits shot image data to a server apparatus together with additional data that includes location information about a photographing point, so that they are stored in the server apparatus. That is, the server apparatus accumulates pieces of image data obtained by photographing in various places by a great number of imaging apparatuses together with the location information thereof. A user of the display apparatus (the imaging/display apparatus 1 or the display apparatus 40) specifies a location on the map image. Then, the display apparatus transmits location specification information to the server apparatus, and the server apparatus searches for the image data based on the location specification information, and transmits the image data corresponding to the location specification information to the display apparatus. The display apparatus receives and displays the image data.

7 Claims, 13 Drawing Sheets

U.S. PATENT DOCUMENTS

| | | |
|---|---|---|
| 2001/0040590 A1 | 11/2001 | Abbott et al. |
| 2002/0010734 A1* | 1/2002 | Ebersole et al. ............... 709/201 |
| 2002/0080155 A1 | 6/2002 | Abbott et al. |
| 2003/0011684 A1* | 1/2003 | Narayanaswami et al. ......................... 348/207.99 |
| 2004/0064479 A1 | 4/2004 | Iga |
| 2004/0174443 A1* | 9/2004 | Simske ....................... 348/231.3 |
| 2005/0060299 A1* | 3/2005 | Filley et al. ......................... 707/3 |
| 2005/0160067 A1 | 7/2005 | Sohma et al. |
| 2006/0025071 A1* | 2/2006 | Yamazaki et al. ............ 455/3.06 |
| 2006/0158722 A1* | 7/2006 | Fujimoto et al. .............. 359/399 |
| 2006/0187317 A1* | 8/2006 | Montulli et al. ............ 348/231.5 |
| 2006/0197781 A1* | 9/2006 | Arutunian ...................... 345/629 |
| 2007/0032945 A1* | 2/2007 | Kaufman ....................... 701/208 |
| 2007/0064263 A1* | 3/2007 | Silverbrook et al. ......... 358/1.15 |
| 2007/0135136 A1* | 6/2007 | Ische ........................... 455/456.1 |
| 2007/0232373 A1* | 10/2007 | Yoshida et al. ............ 455/575.6 |
| 2007/0244633 A1* | 10/2007 | Phillips et al. ................. 701/207 |
| 2008/0082264 A1* | 4/2008 | Hill et al. ....................... 701/213 |
| 2008/0107361 A1 | 5/2008 | Asukai et al. |
| 2008/0129839 A1 | 6/2008 | Asukai et al. |
| 2008/0133526 A1* | 6/2008 | Haitani et al. ..................... 707/7 |
| 2008/0253695 A1 | 10/2008 | Sano et al. |
| 2008/0259199 A1 | 10/2008 | Sako et al. |
| 2010/0220037 A1 | 9/2010 | Sako et al. |

FOREIGN PATENT DOCUMENTS

| | | |
|---|---|---|
| EP | 1517251 A2 | 3/2005 |
| JP | 2001-034615 A | 2/2001 |
| JP | 2001-050759 A | 2/2001 |
| JP | 2003-244691 | 8/2003 |
| JP | 2003-288247 A | 10/2003 |
| JP | 2004-537193 | 12/2004 |
| JP | 2004-538679 | 12/2004 |
| JP | 2004-538681 | 12/2004 |
| JP | 2005-337863 | 12/2005 |
| JP | 2005-341604 | 12/2005 |

OTHER PUBLICATIONS

Daisuke, Ito et al., "Authoring of Location-based Information using GIS Data and Augmented Reality", IEICE Technical Report, Jan. 19, 2006, vol. 105, No. 566, pp. 1-6.

* cited by examiner (a)

POINT IMAGE DATABASE 71

| | LOCATION INFORMATION (LATITUDE/ LONGITUDE) | DATE/TIME INFORMATION | IMAGE MANAGEMENT INFORMATION | IMAGE DATA (AND AUDIO DATA) |
|---|---|---|---|---|
| #1 | P1 | Data1 | C1 | VD1 |
| #2 | P2 | Data2 | C2 | VD2 |
| #3 | P3 | Data3 | C3 | VD3 |
| #4 | P4 | Data4 | C4 | VD4 |
| | ⋮ | ⋮ | ⋮ | ⋮ |

(a)

(b)

(a)

(b)

(c)

(d)

IMAGE DISPLAY SYSTEM, DISPLAY APPARATUS, AND DISPLAY METHOD

CROSS REFERENCE TO RELATED APPLICATIONS

This application claims the benefit under 35 U.S.C. § 371 as a U.S. national stage entry of International Patent Application Serial No. PCT/JP2007/071491 filed on Nov. 5, 2007, which claims priority to Japanese Priority Patent Application JP 2006-330832, filed in the Japan Patent Office on Dec. 7, 2006. The entire contents of both applications are incorporated herein by reference to the maximum extent allowable by the law.

TECHNICAL FIELD

The present invention relates to an image display system, a display apparatus, and a display method. In particular, the present invention relates to a technology for displaying an image shot by an external imaging apparatus, based on specification of a location on a map image at the part of display apparatus.

An example of a data communication system is described in Japanese Patent Laid-Open No. 2005-341604.

A technique of updating a relief map possessed by a car navigation system using an image taken by a camera is described in Japanese Patent Laid-Open No. 2005-337863.

Attempts to expand programs that have been broadcast and recorded to the WWW (World Wide Web) to enjoy them are disclosed in JP-T-2004-538681, JP-T-2004-537193, and JP-T-2004-538679.

BACKGROUND ART

However, in the past, no technique has been proposed yet that allows a user to specify an arbitrary location on a map image to see an image of that location.

Thus, the present invention seeks to allow the user to specify a location on the map image to see an image actually shot at that location.

DISCLOSURE OF INVENTION

An image display system according to the present invention includes a display apparatus, an imaging apparatus to be placed on a movable body for photographing, and a server apparatus, and each of the display apparatus and the imaging apparatus is capable of communicating with the server apparatus. The imaging apparatus includes: imaging means for photographing; location detection means for detecting location information; and control means for performing a transmission control process of causing image data obtained by the photographing by the imaging means and additional data that includes at least the location information detected by the location detection means when the image data was obtained by the photographing to be transmitted to the server apparatus. The server apparatus includes: storage means for storing the image data and the additional data transmitted from the imaging apparatus; and control means for performing a search/transmission control process of searching through the image data stored in the storage means based on location specification information transmitted from the display apparatus, and causing image data found to be read and transmitted to the display apparatus. The display apparatus includes: display means for performing image display; and control means for performing a map display process of causing the display means to display a map image, a location specification process of setting the location specification information based on an input on the map image, an image request transmission process of transmitting the location specification information to the server apparatus to make a request for the image data, and a display process of receiving the image data transmitted from the server apparatus in response to the image request transmission process and causing the display means to perform a display operation based on the received image data.

The movable body on which the imaging apparatus is placed may be one of a person, a non-human creature, a device that travels on the ground, a device that travels on a sea surface, a device that travels beneath the sea surface, a device that travels through the air, and a device that travels outside the atmosphere of the earth.

Also, the imaging apparatus may further include date/time detection means for detecting a current date and time, wherein: the control means of the imaging apparatus allows the additional data to include date/time information detected by the date/time detection means when the image data was obtained by photographing; the control means of the display apparatus performs a date/time specification process of setting date/time specification information for specifying a date and time, and, in the image request transmission process, transmits the date/time specification information, together with the location specification information, to the server apparatus; and in the search/transmission control process, the control means of the server apparatus searches through the image data stored in the storage means based on the location specification information and the date/time specification information transmitted from the display apparatus.

A display apparatus according to the present invention includes: display means for performing image display; communication means for performing data communication with an external server apparatus; and control means for performing a map display process of causing the display means to display a map image, a location specification process of setting location specification information based on an input on the map image, an image request transmission process of transmitting the location specification information to the server apparatus via the communication means to make a request for image data, and a display process of causing the communication means to receive the image data transmitted from the server apparatus in response to the image request transmission process and causing the display means to perform a display operation based on the received image data.

Also, in the location specification process, the control means may use, as the location specification information, information of a latitude and longitude of a point specified for the map image.

Also, the control means may further perform a date/time specification process of setting date/time specification information for specifying a date and time, and, in the image request transmission process, perform a process of transmitting the date/time specification information, together with the location specification information, to the server apparatus.

Also, the display means may be configured to be arranged in front of an eye of a user to perform image display.

The display apparatus may further include imaging means for photographing and location detection means for detecting location information, wherein the control means is additionally capable of performing a transmission control process of causing image data obtained by the photographing by the imaging means and additional data that includes at least the location information detected by the location detection means when the image data was obtained by the photographing to be transmitted to the server apparatus via the communication means.

A display method according to the present invention includes: a map display process step of causing a map image to be displayed; a location specification process step of setting location specification information based on an input on the map image; an image request transmission process step of transmitting the location specification information to an external server apparatus to make a request for image data; and a display step of receiving the image data transmitted from the server apparatus in response to the image request transmission process, and performing a display operation based on the received image data.

According to the present invention as described above, a user of the display apparatus is, by specifying a location on the map image, able to see an image actually shot by the imaging apparatus at that specified location.

Examples of such external imaging apparatuses include: an imaging apparatus worn by another person; an imaging apparatus attached to an automobile, a train, or the like; and an imaging apparatus placed on an animal, a bird, or the like. Pieces of image data (video and still images) obtained by photographing by these imaging apparatuses are transmitted to the server apparatus together with the additional data including the location information about photographing points, and stored in the server apparatus. Accordingly, the pieces of image data obtained by photographing in various places by a great number of imaging apparatuses are accumulated in the server apparatus together with the location information.

Thus, if the location is specified at the display apparatus and the location specification information is transmitted to the server apparatus, the server apparatus is able to search for the image data based on the location specification information. The server apparatus searches for the image data corresponding to the location specification information, and transmits it to the display apparatus. The display apparatus displays the received image data. As a result, the user of the display apparatus can see a scene photographed at the specified point, as an image displayed.

Note that examples of the map image in the present invention include not only images of "maps" showing roads, geographic features, buildings, natural objects, and so on on the ground but also images of a variety of figures that can be used when specifying a specific location, such as an ocean chart, an undersea topographic map, an aeronautical chart, and a space chart.

According to the present invention, the user of the display apparatus is, by specifying a location on the map image, able to see an image actually shot by the imaging apparatus at that specified location. Thus, the present invention provides a system and apparatus that satisfy a variety of needs of users, such as a desire to watch and enjoy a scene at a certain place that can be specified on the map, and a desire to know a situation of a certain place that can be specified on the map. Further, the ability to specify a location on the map image and see an image shot at that location allows the user to know, as circumstances of the specified location, a geographic feature thereof, a view of a nearby building or natural object, the width of a road or the number of lanes, a state that varies depending on the date and time, or the like, for example. Thus, application to a so-called navigation system makes it possible to provide an expansive information providing service.

BRIEF DESCRIPTION OF DRAWINGS

FIG. 10 is a diagram illustrating a point image database according to one embodiment of the present invention.

BEST MODES FOR CARRYING OUT THE INVENTION

Hereinafter, an image display system, a display apparatus, and a display method according to preferred embodiments of the present invention will be described. An imaging/display apparatus 1 or a display apparatus 40 according to the preferred embodiments correspond to a display apparatus as recited in the appended claims, and in the preferred embodiments, a display method according to the present invention is performed as a procedure of the imaging/display apparatus 1 or the display apparatus 40. Meanwhile, the imaging/display apparatus 1 or an imaging apparatus 30 according to the preferred embodiments correspond to an imaging apparatus as recited in the appended claims. Therefore, the imaging/display apparatus 1 according to the preferred embodiments is able to function as both the display apparatus and the imaging apparatus as recited in the appended claims.

The following description follows the following order.

[1. Exemplary appearances of imaging/display apparatus, imaging apparatus, and display apparatus]

[2. System configuration]

[3. Exemplary structures of imaging/display apparatus, imaging apparatus, display apparatus, and server apparatus]

[4. Exemplary system operation]

[5. Effects of embodiments, exemplary variants, and exemplary expansions]

[1. Exemplary Appearances of Imaging/Display Apparatus, Imaging Apparatus, and Display Apparatus]

Figure 1:
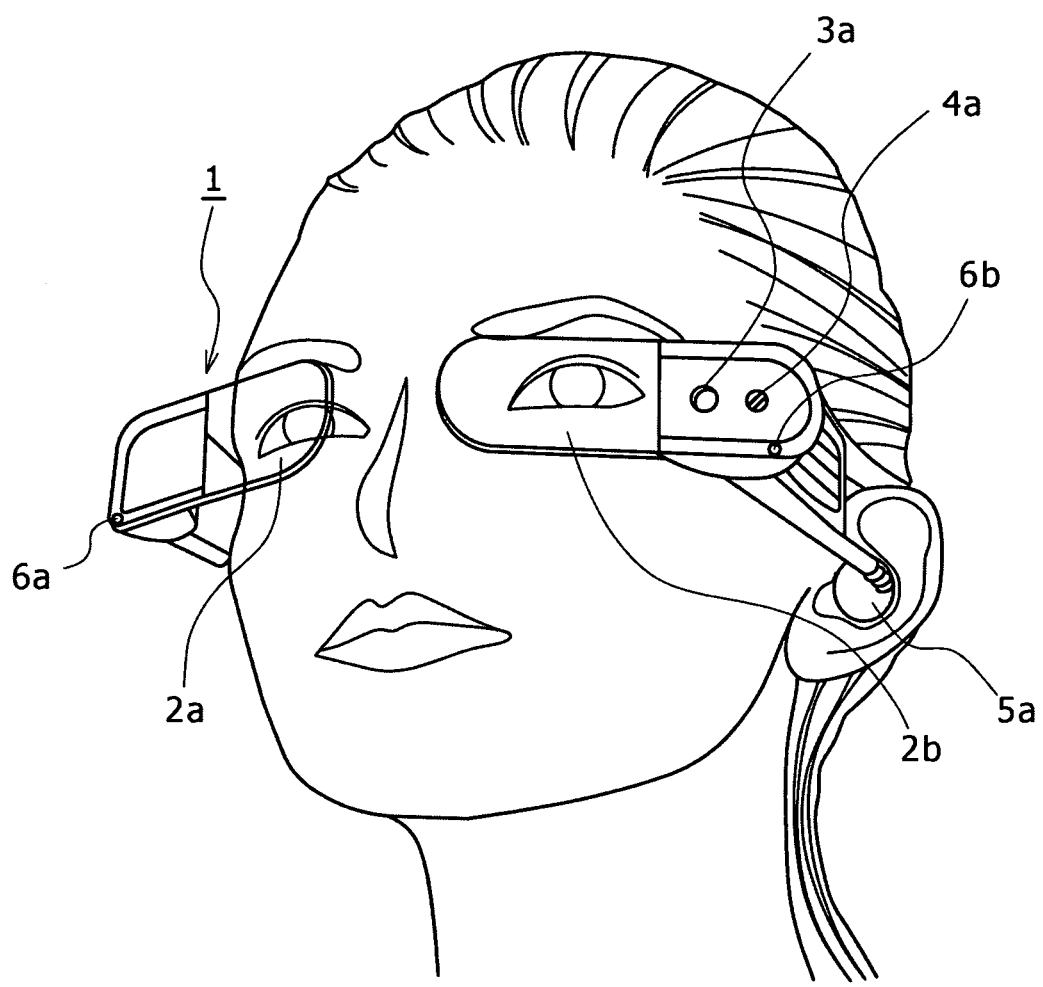
FIG. 1 is an illustration showing an exemplary appearance of an imaging/display apparatus according to one embodiment of the present invention.

FIG. 1 illustrates an exemplary appearance of the imaging/display apparatus 1. This imaging/display apparatus 1 can be worn by a user as a spectacle-shaped display camera.

The imaging/display apparatus 1 has a wearing unit having a frame structure that extends halfway around a head from both temporal regions to an occipital region, for example, and is worn by the user with the wearing unit placed over ears as illustrated in this figure.

The imaging/display apparatus 1 has a pair of display panel sections 2a and 2b designed for left and right eyes, and the display panel sections 2a and 2b are arranged in front of the eyes of the user (i.e., at positions where lenses of common spectacles would be located) when the imaging/display apparatus 1 is worn by the user in a manner as illustrated in FIG. 1. Liquid crystal panels, for example, are used for the display panel sections 2a and 2b, and the display panel sections 2a and 2b are capable of entering a see-through state, i.e., a transparent or translucent state, as illustrated in this figure by transmittance control. The capability of the display panel sections 2a and 2b to enter the see-through state allows the user to wear the imaging/display apparatus 1 at all times as he or she wears spectacles, with no interference occurring in his or her daily life.

In addition, the imaging/display apparatus 1 has an image-pickup lens 3a arranged to face forward so as to image a scene that is in a direction in which the user sees while the imaging/display apparatus 1 is worn by the user.

In addition, the imaging/display apparatus 1 has a lighting section 4a that provides illumination in a direction in which the image-pickup lens 3a takes an image. The lighting section 4a is formed by a light emitting diode (LED), for example.

In addition, the imaging/display apparatus 1 has a pair of earphone speakers 5a that can be inserted into right and left earholes of the user when the imaging/display apparatus 1 is worn by the user. Note that only the left earphone speaker 5a is shown in the figure.

In addition, the imaging/display apparatus 1 has microphones 6a and 6b for collecting external sounds. The microphones 6a and 6b are arranged to the right of the display panel section 2 for a right eye and to the left of the display panel section 2 for a left eye, respectively.

Note that FIG. 1 only shows one example, and that various structures are possible for the user to wear the imaging/display apparatus 1. In general, a requirement for the wearing unit is that it be in the shape of spectacles or of a head-worn type so that the display panel sections 2a and 2b are arranged in front of and close to the eyes of the user, for example, and that the direction in which the image-pickup lens 3a takes an image is a direction in which the eyes of the user are directed, i.e., in a forward direction. Also note that although the pair of display panel sections 2a and 2b may be provided for the both eyes as described above, only one display section may be provided for one of the eyes.

Also note that the direction in which the image-pickup lens 3a takes an image need not coincide with the direction in which the eyes of the user are directed. For example, the image-pickup lens 3a may image sideways or rearward.

Also note that the imaging/display apparatus 1 need not have the left and right stereo speakers 5a, but may have only one of the earphone speakers 5a to be inserted into one of the earholes. Also note that the number of microphones may be one. That is, the imaging/display apparatus 1 may have only one of the microphones 6a and 6b. Also note that the imaging/display apparatus 1 need not have any microphone or earphone speaker.

Also note that the imaging/display apparatus 1 need not have any lighting section 4a.

Although the wearing unit of the imaging/display apparatus 1 has been described as being in the shape of spectacles or of the head-mounted type, the wearing unit used for the user to wear the imaging/display apparatus may be of any type, such as a headphone type, a neckband type, a behind-the-ear type, or the like. Further, the imaging/display apparatus may be attached to common spectacles, visor, headphone, or the like via a fixing device, such as a clip, so that the imaging/display apparatus can be worn by the user. Also note that it is not necessary that the imaging/display apparatus be worn on the head of the user.

The imaging/display apparatus 1 illustrated in FIG. 1 is a device that is to be worn by the user and in which a component for imaging and the display panel sections 2a and 2b for monitoring an image are integrated in one unit. However, there are other examples of devices to be worn by the user, such as the imaging apparatus 30 illustrated in (a) of FIG. 2 and the display apparatus 40 illustrated in (b) of FIG. 2.

Figure 2:
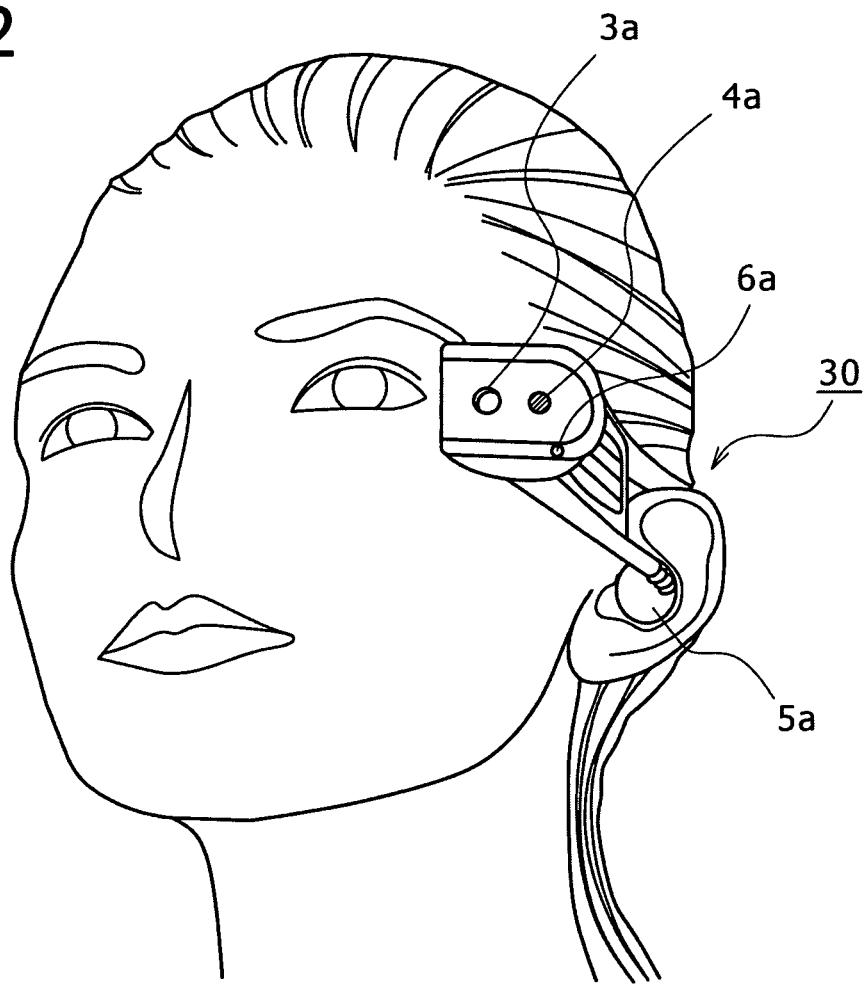
FIG. 2 is an illustration showing exemplary appearance of an imaging apparatus and a display apparatus according to one embodiment of the present invention.
Figure 2:
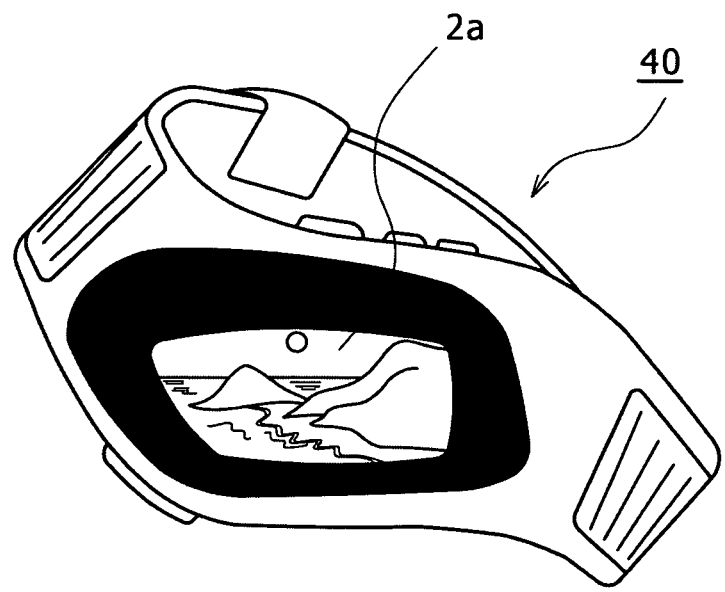

The imaging apparatus 30 illustrated in (a) of FIG. 2 is worn on one of the temporal regions of the user using a predetermined wearing frame. The imaging apparatus 30 has the image-pickup lens 3a and the lighting section 4a, which are arranged to face forward so as to image a scene that is in the direction in which the user sees while the imaging apparatus 30 is worn by the user. In addition, the imaging apparatus 30 has the microphone 6a for collecting the external sounds.

That is, the imaging apparatus 30 is a device that does not have a display capability but has a capability to image a scene within the user's field of vision while it is worn by the user. As is also the case with the imaging/display apparatus 1 described above, the imaging apparatus 30 can have a variety of shapes, structures for wearing, and components.

The display apparatus 40 illustrated in (b) of FIG. 2 is a display apparatus in the shape of a wristwatch. The display apparatus 40 has the display panel section 2a which the user can see while the display apparatus 40 is worn on a wrist of the user using a wristband.

While the display apparatus 40 illustrated in (b) of FIG. 2 assumes the shape of the wristwatch, the display apparatus 40 to be worn or carried by the user can have a variety of shapes and structures for wearing or carrying. The display apparatus 40 may be a small portable device that can be carried by the user, for example. Also, the display apparatus 40 may be a spectacle-shaped device to be worn by the user (i.e., a device that is similar to the imaging/display apparatus 1 illustrated in FIG. 1 except that this device does not have an imaging capability).

While the display apparatus 40 to be carried by the user may be a device dedicated to displaying for monitoring, other types of devices having the display capability, such as a mobile phone, a portable game machine, and a personal digital assistant (PDA), also can function as the display apparatus 40 according to the present embodiment.

Also, besides such devices as can be worn or carried by the user, a stationary display apparatus, a computer apparatus, a television receiver, an in-vehicle display monitor, and so on can also be adopted as the display apparatus 40 according to the present embodiment.

While the imaging apparatus 30 and the display apparatus 40 illustrated in (a) and (b) of FIG. 2 may be used independently of each other, both of the imaging apparatus 30 and the display apparatus 40 may be worn by the user and used in combination as the imaging/display apparatus. In that case, the imaging apparatus 30 and the display apparatus 40 may perform data communication with each other so that the display apparatus 40 displays an image taken by the imaging apparatus 30 for monitoring or displays an image transmitted from an external device, for example.

It is assumed in the present embodiment that the imaging/display apparatus 1 and the display apparatus 40 are used by human users, and that the imaging apparatus 30 is placed on a variety of movable bodies including people and used thereat. Although the imaging apparatus 30 as illustrated in (a) of FIG. 2 is supposed to be worn by a person to image a scene within that person's field of vision, there are a variety of other imaging apparatuses 30 that are placed on movable bodies other than people.

Examples of the movable bodies other than people include non-human creatures, devices that travel on the ground, devices that travel on a sea surface, devices that travel beneath the sea surface, devices that travel through the air, and devices that travel outside the atmosphere of the earth.

Examples of the non-human creatures include birds, mammals, reptiles, amphibians, fish, insects, and a variety of other creatures.

Examples of the devices that travel on the ground include automotive vehicles, such as cars, trucks, buses, taxis, and motorcycles, and human-powered vehicles, such as bicycles, rickshaw, and toy vehicles. Other examples include railway vehicles such as trains and steam locomotives. Still other examples include rides at an amusement park or the like, and business-use vehicles used in a factory or other facilities. The devices that travel on the ground are not limited to movable bodies on which people ride. For example, various types of robots designed for business or entertainment use and toys such as radio-controlled toys are also examples of the devices that travel on the ground.

Examples of the devices that travel on the sea surface include a variety of watercrafts such as ships, boats, personal watercrafts, surfboards, rowboats, inflatable rings, and rafts.

Examples of the devices that travel beneath the sea surface include submarines, autonomous underwater vehicles, and diving equipment such as aqualungs.

Examples of the devices that travel through the air include a variety of aircrafts such as airplanes, helicopters, gliders, parachutes, balloons, and kites.

Examples of the devices that travel outside the atmosphere of the earth include rockets, space probes, and satellites.

It will be appreciated that there are a variety of other specific examples of movable bodies. The shape and structure for placing of the imaging apparatus 30 depends on the movable body on which the imaging apparatus 30 is placed.

[2. System Configuration]

In the embodiment, the user of the imaging/display apparatus 1 or the display apparatus 40 can specify a location on the map image being displayed to watch an image shot at that location by another imaging/display apparatus 1 or imaging apparatus 30. In other words, the user of the image/display apparatus 1 or the display apparatus 40 is, while seeing the map, able to watch an image of a scene at the location actually shown on the map with his or her imaging/display apparatus 1 or display apparatus 40. An exemplary system configuration for achieving this is illustrated in FIG. 3.

Note that it is assumed that examples of the "map images" include not only ground maps as described above but also ocean charts, undersea maps, and aeronautical charts.

Figure 3:
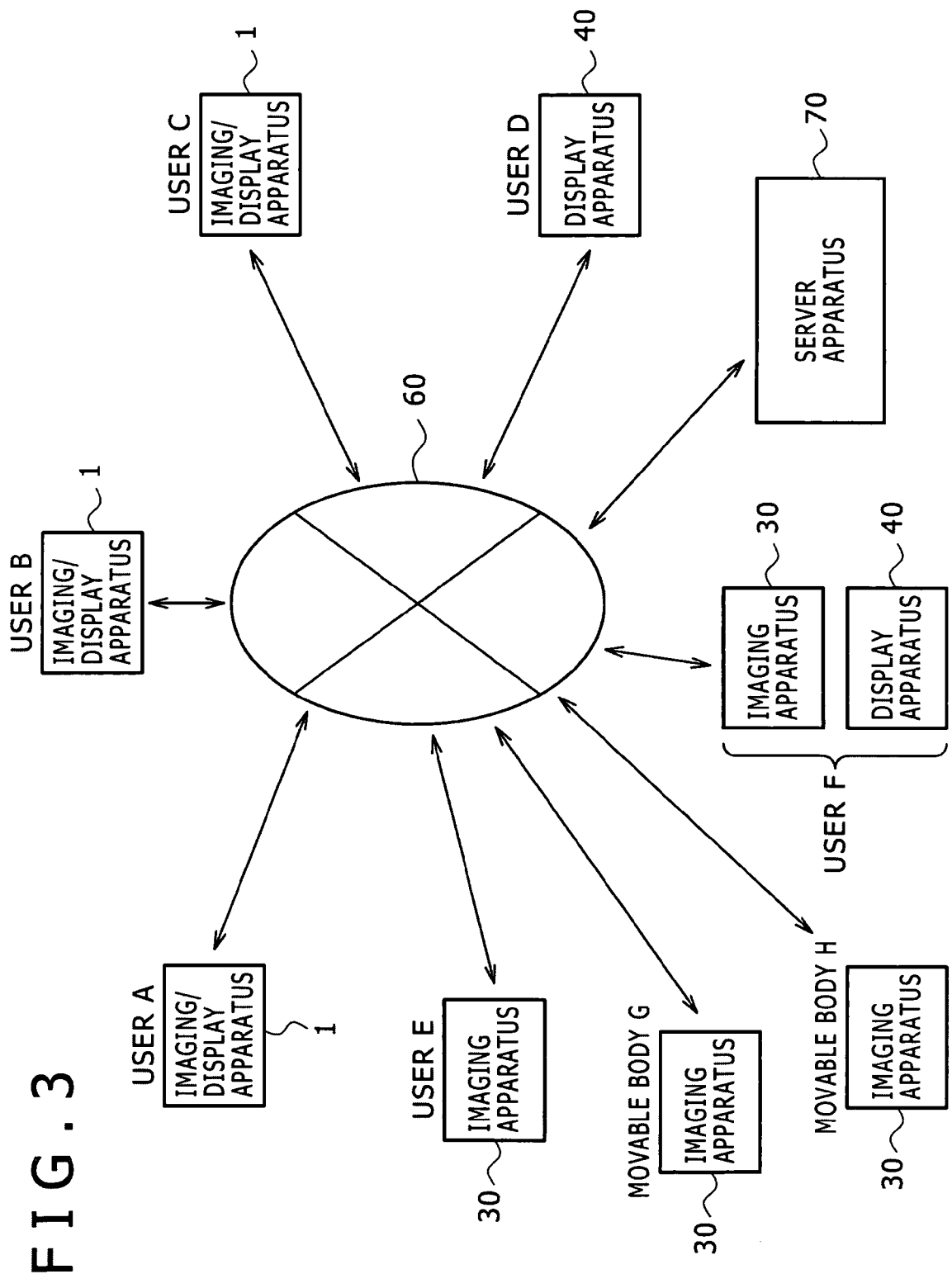
FIG. 3 is a diagram illustrating an exemplary system configuration according to one embodiment of the present invention.

FIG. 3 illustrates a configuration of a system in which the imaging/display apparatuses 1, the display apparatuses 40, the imaging apparatuses 30, and a server apparatus 70 communicate with one another via a network 60.

Examples of the network 60 include wide-area networks, such as the Internet, and small-area networks, such as a local area network (LAN).

It is assumed here that users A, B, and C are wearing the imaging/display apparatus 1 as illustrated in FIG. 1, for example. It is also assumed here that user D is wearing the display apparatus 40 as illustrated in (b) of FIG. 2, for example, and that user E is wearing the imaging apparatus 30 as illustrated in (a) of FIG. 2.

It is further assumed that user F is wearing both the imaging apparatus 30 as illustrated in (a) of FIG. 2 and the display apparatus 40 as illustrated in (b) of FIG. 2, which combine to function as the imaging/display apparatus.

It is also assumed that the imaging apparatuses 30 mounted on movable bodies G and H are imaging apparatuses that are mounted on a movable body (a movable body other than a person), such as an automobile, a railway vehicle, or an aircraft, and have a suitable form to be placed thereon.

In this case, each of the imaging apparatus 30 worn by user E and the imaging apparatuses 30 mounted on movable bodies G and H uploads, constantly, regularly, or at an arbitrary time, image data obtained by taking an image and additional data that includes at least the speed information indicative of the speed at the time of taking an image to the server apparatus 70 via the network 60.

Each of the imaging/display apparatuses 1 worn by users A, B, and C is also capable of uploading, constantly, regularly, or at an arbitrary time, the image data obtained by taking an image and the additional data that includes at least the speed information indicative of the speed at the time of imaging to the server apparatus 70 via the network 60.

The server apparatus 70 registers and stores the imaging/display apparatuses 1 and the imaging apparatuses 30 in a point image database, which will be described below.

Meanwhile, in response to the user's specifying a point on the map image, each of the imaging/display apparatuses 1 worn by users A, B, and C and the display apparatuses 40 used by users D and F accesses the server apparatus 70 via the network 60 and transmits the point specification information indicative of the specified speed to the server apparatus 70 to make a request for an image.

Based on the point specification information, the server apparatus 70 searches the point image database to extract image data of an image taken by an imaging apparatus or imaging/display apparatus that was moving at the specified speed indicated by the point specification information. Then, the server apparatus 70 transmits the extracted image data to the imaging/display apparatus 1 or the display apparatus 40.

The imaging/display apparatus 1 or the display apparatus 40 receives the image data transmitted from the server apparatus 70, and displays the received image data.

In the above-described manner, users A, B, C, D, and F are able to watch a scene that was actually taken at the location specified on the map.

[3. Exemplary Structures of Imaging/Display Apparatus, Imaging Apparatus, Display Apparatus, and Server Apparatus]

Exemplary structures of the imaging/display apparatus 1, the imaging apparatus 30, the display apparatus 40, and the server apparatus 70 will now be described below with reference to FIGS. 4 to 8.

First, the exemplary structure of the imaging/display apparatus 1 will be described below with reference to FIG. 4.

A system controller 10 is formed by a microcomputer that includes a central processing unit (CPU), a read only memory (ROM), a random access memory (RAM), a nonvolatile memory section, and an interface section, for example, and controls an overall operation of the imaging/display apparatus 1. Based on a program held in the internal ROM or the like, the system controller 10 performs a variety of computational processes and exchanges a control signal and so on with each part of the imaging/display apparatus 1 via a bus 13 to cause each part of the imaging/display apparatus 1 to perform a necessary operation.

The imaging/display apparatus 1 includes an imaging section 3 as a component for imaging the scene that is in the direction in which the user sees.

The imaging section 3 includes an imaging optical system, an imaging device section, and an imaging signal processing section.

The imaging optical system in the imaging section 3 is provided with: a lens system formed by the image-pickup lens 3a illustrated in FIG. 1, a diaphragm, a zoom lens, a focus lens, and the like; a driving system for allowing the lens system to perform a focusing operation, a zoom operation; and the like.

The imaging device section in the imaging section 3 is provided with a solid-state imaging device array for detecting light for imaging obtained by the imaging optical system, and subjecting the detected light to optical-to-electrical conversion to generate an imaging signal. The solid-state imaging device array is, for example, a CCD (charge coupled device) sensor array or a CMOS (complementary metal oxide semiconductor) sensor array.

The imaging signal processing section in the imaging section 3 includes a sample-hold/AGC (automatic gain control) circuit for subjecting the signal obtained by the solid-state imaging device to gain control and waveform shaping, and a video A/D converter, and obtains picked-up image data in digital form. The imaging signal processing section also performs white balancing processing, brightness processing, color signal processing, blur correction processing, and the like on the picked-up image data.

Imaging is performed by the imaging section 3 that includes the imaging optical system, the imaging device section, and the imaging signal processing section described above, so that the image data is obtained by imaging.

The system controller 10 performs control of turning on and off of an imaging operation in the imaging section 3, drive control of the zoom lens and the focus lens in the imaging optical system, control of sensitivity and a frame rate in the imaging device section, setting of a parameter for each process and setting for a process performed in the imaging signal processing section, and so on.

The picked-up image data obtained by the imaging operation performed by the imaging section 3 can be supplied to a display section 2, a storage section 25, or a communication section 26 via an image processing section 15.

Under control of the system controller 10, the image processing section 15 performs a process of converting the picked-up image data into a predetermined image data format, and necessary signal processing for allowing the image data to be displayed on the display section 2 for monitoring. Examples of the signal processing for allowing the image data to be displayed on the display section 2 for monitoring include: brightness level control; color correction; contrast control; sharpness (edge enhancement) control; a split screen process; a process of synthesizing a character image; generation of a magnified or reduced image; and application of image effects, such as a mosaic image, a brightness-reversed image, soft focus, highlighting of a part of the image, and varying of an overall color atmosphere of the image.

The image processing section 15 also performs a process of transferring the image data among the imaging section 3, the display section 2, the storage section 25, and the communication section 26. Specifically, the image processing section 15 performs a process of supplying the picked-up image data from the imaging section 3 to the display section 2, the storage section 25, or the communication section 26, a process of supplying image data read from the storage section 25 to the display section 2, and a process of supplying image data received by the communication section 26 to the display section 2.

The imaging/display apparatus 1 includes the display section 2 as a component for presenting a display to the user. The display section 2 is provided with the above-described display panel sections 2a and 2b formed by the liquid crystal panels, and a display driving section for driving the display panel sections 2a and 2b to display.

The display driving section is formed by a pixel driving circuit for allowing an image signal supplied from the image processing section 15 to be displayed on the display panel sections 2a and 2b, which are formed as liquid crystal displays, for example. That is, the display driving section applies driving signals based on a video signal to pixels arranged in a matrix in the display panel sections 2a and 2b with predetermined horizontal/vertical driving timing for displaying. As a result of this process, an image taken by the imaging section 3, an image of the image data read from the storage section 25, or an image of the image data received by the communication section 26 is displayed on the display panel sections 2a and 2b.

In addition, the display driving section is capable of controlling transmittance of each of the pixels in the display panel sections 2a and 2b to allow the pixel to enter the see-through state (i.e., the transparent or translucent state).

The system controller 10 performs on/off (see-through) control of a display operation in the display section 2, specification of a process parameter related to the image data to be displayed, screen area setting control, instruction for generation of a character, and so on.

The imaging/display apparatus 1 further includes an audio input section 6, an audio processing section 16, and an audio output section 5.

The audio input section 6 includes the microphones 6a and 6b illustrated in FIG. 1, a microphone amplifier section for amplifying audio signals obtained by the microphones 6a and 6b, and an A/D converter, and outputs audio data.

The audio data obtained at the audio input section 6 is supplied to the audio processing section 16.

Under control of the system controller 10, the audio processing section 16 controls transfer of the audio data. Specifically, the audio processing section 16 supplies the audio data obtained at the audio input section 6 to the audio output section 5, the storage section 25, or the communication section 26. The audio processing section 16 also supplies audio data read from the storage section 25 or audio data received by the communication section 26 to the audio output section 5.

Under control of the system controller 10, the audio processing section 16 also performs a process such as volume control, tone control, or application of a sound effect.

The audio output section 5 includes the pair of earphone speakers 5a illustrated in FIG. 1, an amplifier circuit for the earphone speakers 5a, and a D/A converter.

That is, the audio data supplied from the audio processing section 16 is converted by the D/A converter into an analog audio signal, and the analog audio signal is amplified by the amplifier circuit and outputted via the earphone speaker 5a as sound. Thus, the user is able to listen to the external sound, audio based on the audio data read from the storage section 25, or audio based on the audio data received by the communication section 26.

Note that the audio output section 5 may use a so-called bone conduction speaker.

The storage section 25 is a unit for recording and reading the image data (and the audio data) onto or from a predetermined storage medium. For example, the storage section 25 is formed by a hard disk drive (HDD). Needless to say, as the storage medium, various types of storage media are adoptable, such as a solid-state memory like a flash memory, a memory card containing the solid-state memory, an optical disk, a magneto-optical disk, and a hologram memory. A requirement for the storage section 25 is to be capable of recording and reading in accordance with the adopted storage medium.

Under control of the system controller 10, the storage section 25 records the image data (and the audio data) obtained by imaging on the storage medium, or records the image data (and the audio data) received by the communication section 26 on the storage medium. Specifically, the storage section 25 encodes the image data supplied via the image processing section 15 and the audio data supplied via the audio processing section 16, or the image data and the audio data received by the communication section 26, so that they can be recorded on the storage medium, and then records the encoded data on the storage medium.

In addition, under control of the system controller 10, the storage section 25 is also capable of reading the recorded image data and audio data. The read image data is supplied to the display section 2 via the image processing section 15, whereas the read audio data is supplied to the audio output section 5 via the audio processing section 16. It is also possible to supply the read image/audio data to the communication section 26 as data to be transmitted to the external device.

The communication section 26 transmits and receives data to or from the external device, particularly the server apparatus 70, via the network 60 illustrated in FIG. 3.

The communication section 26 may be configured to perform network communication via short-range wireless communication for a network access point, for example, in accordance with a system such as a wireless LAN, Bluetooth, or the like.

The picked-up image data obtained by the imaging section 3 is supplied to the communication section 26 via the image processing section 15. Also, the audio data obtained by the audio input section 6 is supplied to the communication section 26 via the audio processing section 16. The communication section 26 is capable of encoding the image data and the audio data for the purpose of communication, modulating the encoded data for radio transmission, and transmitting the modulated data to the external device. That is, the communication section 26 is capable of transmitting the image data and the audio data currently obtained in the imaging/display apparatus 1 by imaging and sound collecting to the external device (e.g., the server apparatus 70).

In addition, the communication section 26 is also capable of encoding the image data and the audio data read from the storage section 25 for the purpose of communication, modulating the encoded data for radio transmission, and transmitting the modulated data to the external device.

It is to be noted that, at the time when the image/audio data currently obtained in the imaging/display apparatus 1 by imaging and sound collecting is transmitted to the server apparatus 70, for example, the system controller 10 generates the additional data, and causes the communication section 26 to encode and transmit the additional data together with the image/audio data. The additional data includes management information of the image data, the current location information detected by a location detection section 12 described below, and current date/time information obtained by calculation by a date/time calculation section 28.

Another possible operation is an operation of once storing the image/audio data obtained by imaging and sound collecting in the storage section 25, then reading the stored image/audio data from the storage section 25 at a subsequent time, and transmitting the read image/audio data to the server apparatus 70 via the communication section 26. In the case of this operation, the system controller 10, when storing the image/audio data in the storage section 25, generates the additional data including the pieces of information mentioned above, and causes the storage section 25 to record the additional data together with the image/audio data. When the recorded image/audio data is read from the storage section 25 and transmitted to the server apparatus 70, the additional data recorded together is also transmitted to the server apparatus 70.

When the system controller 10 transmits the image/audio data to the server apparatus 70 by performing the above process, location information indicative of a location at which the image data was obtained by taking an image and date/time information indicative of a date and time when the image/audio data was obtained are also transmitted to the server apparatus 70.

In addition, the communication section 26 receives the image/audio data transmitted from the external device (the server apparatus 70), demodulates the received image/audio data, and supplies the demodulated image/audio data to the image processing section 15 and the audio processing section 16. In this case, the received image and audio are outputted via the display section 2 and the audio output section 5, respectively.

Needless to say, the image/audio data received by the communication section 26 may be supplied to the storage section 25 and recorded on the storage medium.

The imaging/display apparatus 1 further includes an illumination section 4 and an illumination control section 14. The illumination section 4 is formed by the lighting section 4a illustrated in FIG. 1 and FIG. 2 and a lighting circuit for causing the lighting section 4a (e.g., the LED) to emit light. Based on an instruction issued from the system controller 10, the illumination control section 14 causes the illumination section 4 to perform a lighting operation.

Because the lighting section 4a in the illumination section 4 is attached to the imaging/display apparatus 1 in the manner illustrated in FIG. 1, the illumination section 4 provides illumination in the direction in which the image-pickup lens 3a takes an image.

The imaging/display apparatus 1 further includes an operation input section 11 for user operation.

The operation input section 11 may include an operation unit(s) such as a key, a dial, or the like, and be configured to detect a user operation such as a key operation. Alternatively, the operation input section 11 may be configured to detect a deliberate behavior of the user.

In the case where the operation input section 11 includes the operation unit(s), the operation unit(s) may include operation units for a power on/off operation, imaging-related operations (e.g., the zoom operation, an operation related to signal processing, etc.), display-related operations (e.g., selection of a display content, an operation for controlling the display, etc.), and an operation for specifying the external device described below.

In the case where the operation input section 11 is configured to detect a user behavior, the operation input section 11 may be provided with an acceleration sensor, an angular velocity sensor, a vibration sensor, a pressure sensor, or the like.

For example, the user's act of tapping the imaging/display apparatus 1 from the side may be detected with the acceleration sensor, the vibration sensor, or the like. Thus, the system controller 10 may determine that a user operation has occurred when lateral acceleration has exceeded a predetermined value, for example. Moreover, the acceleration sensor, the angular velocity sensor, or the like may be used to detect whether the user has tapped the side (which corresponds to a sidepiece of spectacles) of the imaging/display apparatus 1 from the right side or from the left side, and the system controller 10 may regard each of these acts of the user as a predetermined operation.

Further, the user's act of turning or shaking his or her head may be detected with the acceleration sensor, the angular velocity sensor, or the like. The system controller 10 may regard each of these acts of the user as a user operation.

Still further, the pressure sensor may be provided on each of the left and right sides (which correspond to the sidepieces of the spectacles) of the imaging/display apparatus 1, for example. Then, the system controller 10 may determine that the user has performed an operation for telephoto zooming when the user has pushed the right side of the imaging/display apparatus 1 with a finger, and determine that the user has performed an operation for wide-angle zooming when the user has pushed the left side of the imaging/display apparatus 1 with a finger.

Still further, the operation input section 11 may be provided with a biological sensor used to detect biological information concerning the user. In this case, the biological information detected may be recognized as an operation input. Examples of the biological information include a pulse rate, a heart rate, electrocardiogram information, electromyographic information, breathing information (e.g., a rate of breathing, a depth of breathing, the amount of ventilation, etc.), perspiration, GSR (galvanic skin response), blood pressure, a saturation oxygen concentration in the blood, a skin surface temperature, brain waves (e.g., information of alpha waves, beta waves, theta waves, and delta waves), a blood flow change, and the state of the eyes.

Then, the system controller 10 may recognize the information detected by the biological sensor as an operation input by the user. One example of deliberate behaviors of the user is a motion of the eyes (e.g., a change in the direction in which the eyes of the user are directed, winking, etc.). For example, when the user's act of winking three times has been detected, the system controller 10 may regard this act as a specific operation input. Further, it is also possible to detect, based on the biological information detected, that the user has put on or taken off the imaging/display apparatus 1, or that a specific user has put on the imaging/display apparatus 1, for example. Thus, the system controller 10 may turn on or off power of the imaging/display apparatus 1 in response to detection of such an act, for example.

The operation input section 11 supplies, to the system controller 10, information acquired by functioning as the operation unit(s), the acceleration sensor, the angular velocity sensor, the vibration sensor, the pressure sensor, the biological sensor, or the like as described above. The system controller 10 detects the user operation based on the supplied information.

The imaging/display apparatus 1 further includes the location detection section 12. The location detection section 12 is, for example, a GPS receiver section. The GPS receiver section receives a radio wave from a global positioning system (GPS) satellite, and outputs information of a latitude and longitude of a current location to the system controller 10.

When the image/audio data and the additional data are transmitted to the server apparatus 70, location information at the time of imaging as detected by this location detection section 12 is included in the additional data.

Note that the location detection section 12 may employ Wi-Fi (Wireless Fidelity) or a location information service provided by a mobile phone company, or a combination of such a service and the GPS.

Also, a walking speed (or, in the case of a device installed on an automobile or the like, a vehicle speed or the like) may be detected to correct the location of the detection.

The date/time calculation section 28 calculates a current date and time (year, month, day, hour, minute, second). The system controller 10 is capable of recognizing the current date and time based on a value calculated by the date/time calculation section 28.

When the image/audio data and the additional data are transmitted to the server apparatus 70, this additional data includes the date/time information (indicative of the date and time when the image data being transmitted was obtained by imaging) detected by the date/time calculation section 28.

The imaging/display apparatus 1 is capable of displaying a map image on the display section 2. In order to display the map image, the imaging/display apparatus 1 further includes a map database 29. In the case where the storage section 25 is formed by the HDD or the like, for example, the map database 29 may be stored in a partial area of the HDD or the like.

The map database 29 is a database containing, as information used for displaying a map as in a so-called navigation system, information for generating a map image corresponding to the location information, additional information such as names of points, search information, and so on.

The system controller 10 is capable of performing a process of searching for and displaying an appropriate map using the map database 29.

The structure of the imaging apparatus 30 will now be described below with reference to FIG. 5. Note that, in FIG. 5, components that have their counterparts in FIG. 4 are assigned the same reference numerals as those of their counterparts in FIG. 4, and descriptions thereof will be omitted. The imaging apparatus 30 illustrated in FIG. 5 is different from the imaging/display apparatus 1 illustrated in FIG. 4 in that the imaging apparatus 30 does not include the display section 2 for outputting the image, the audio output section 5 for outputting the audio, or the map database 29 used for displaying the map.

That is, while the imaging apparatus 30 is worn by the user as illustrated in FIG. 2 or is placed on various movable bodies as described above, the imaging apparatus 30 is capable of imaging by means of the imaging section 3, and transmitting the picked-up image data to the external device via the communication section 26 or recording the picked-up image data in the storage section 25.

The system controller 10 controls the imaging operation, a communication operation, a recording operation, and so on.

Figure 6:
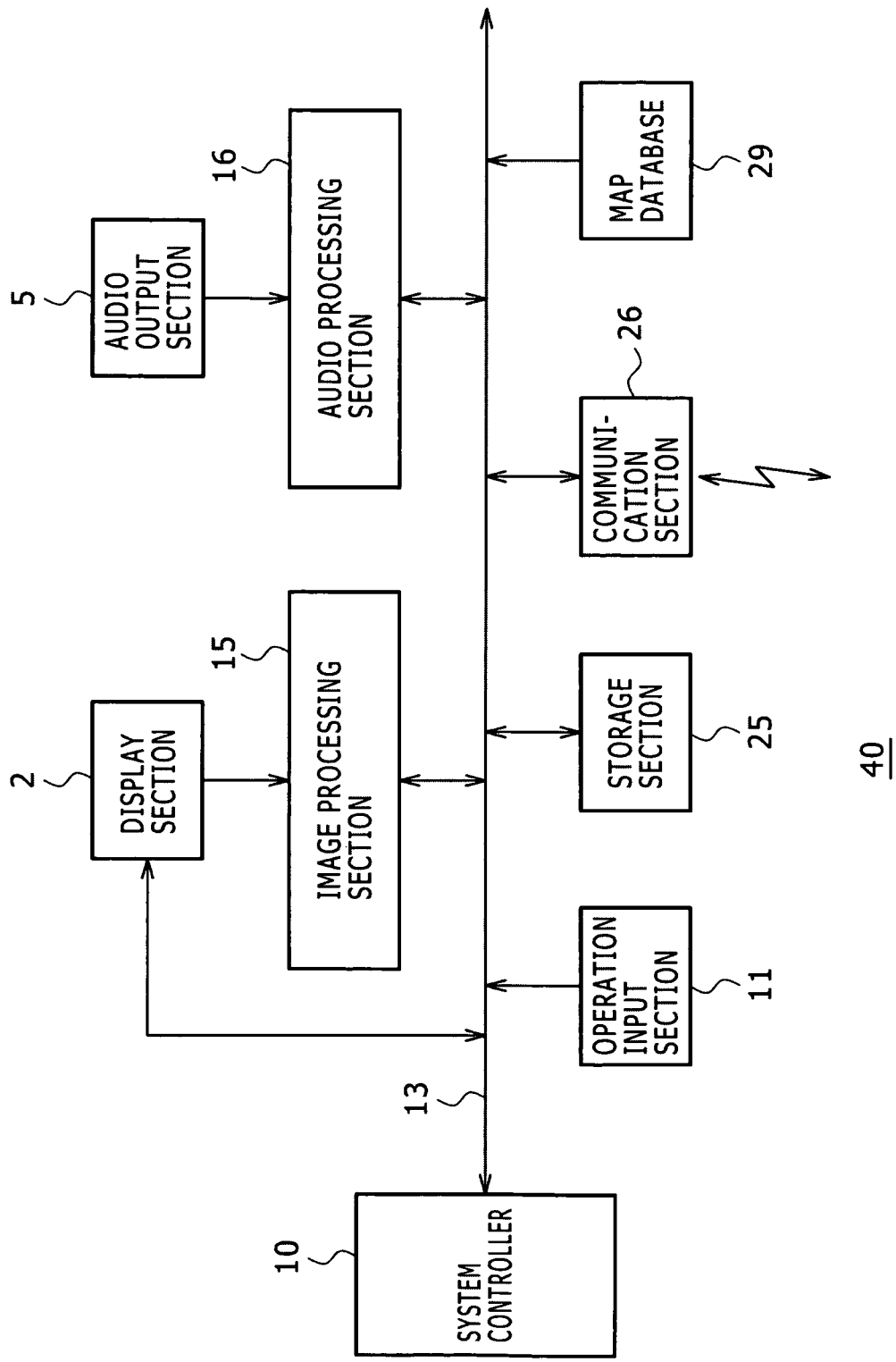
FIG. 6 is a block diagram of a display apparatus according to one embodiment of the present invention.

The exemplary structure of the display apparatus 40 will now be described below with reference to FIG. 6. Note that, in FIG. 6, components that have their counterparts in FIG. 4 are assigned the same reference numerals as those of their counterparts in FIG. 4, and descriptions thereof will be omitted. The display apparatus 40 illustrated in FIG. 6 is different from the imaging/display apparatus 1 illustrated in FIG. 4 in that the display apparatus 40 does not include the imaging section 3 for imaging or the audio input section 6 for audio input. Further, the display apparatus 40 is not provided with the illumination section 4 or the illumination control section 14, which are helpful for imaging.

Because the display apparatus 40 is not designed to transmit the image/audio data to the server apparatus 70, the display apparatus 40 need not be provided with the location detection section 12 or the date/time calculation section 28 for generating the location information or the date/time information to be included in the additional data to when transmitting.

Needless to say, the system controller 10 need not have a capability to perform a process of controlling the transmission of the image/audio data to the server apparatus 70.

The display apparatus 40 is a device to be worn by the user in a manner as suggested by (b) of FIG. 2, or carried by the user, or installed by the user in a house, the automobile, or the like. The display apparatus 40 receives, via the communication section 26, the image/audio data transmitted from the external device. Then, the display apparatus 40 outputs the received image/audio data via the display section 2 and the audio output section 5, or records the received image/audio data in the storage section 25.

The system controller 10 controls the communication operation, the display operation, an audio output operation, the recording operation, and so on.

In the case where the display apparatus is fixedly installed in the house or the like, the communication section 26 may be configured to perform network communication via wired connection.

Both the imaging apparatus 30 and the display apparatus 40 as illustrated in (a) and (b) of FIG. 2 may be used by the same user, as user F illustrated in FIG. 3 does, so that the imaging apparatus 30 and the display apparatus 40 combine to fulfill functions similar to those of the imaging/display apparatus 1.

Figure 7:
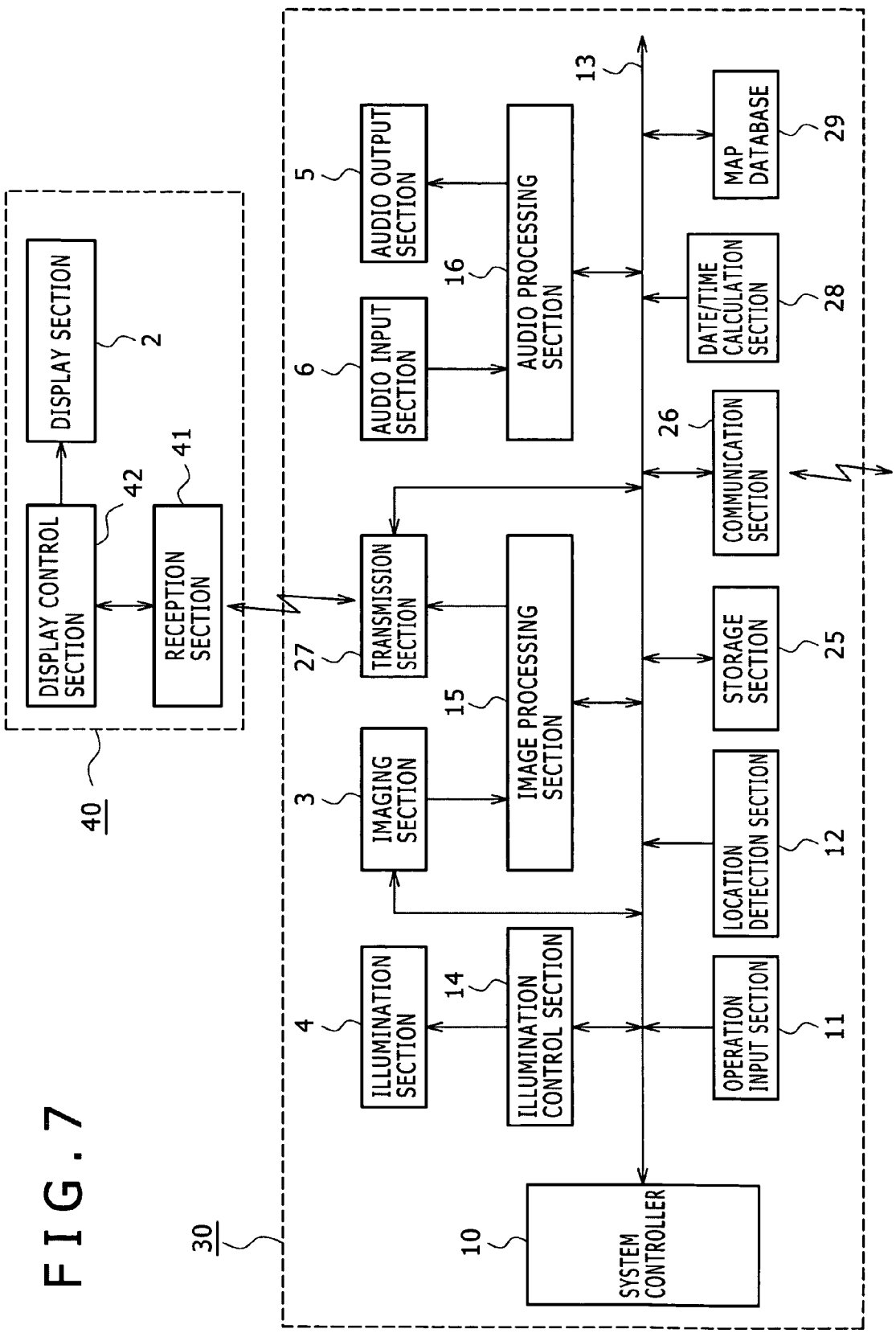
FIG. 7 is a block diagram of an imaging apparatus and a display apparatus according to one embodiment of the present invention.

In this case, the imaging apparatus 30 and the display apparatus 40 may have a configuration as illustrated in FIG. 7.

Figure 4:
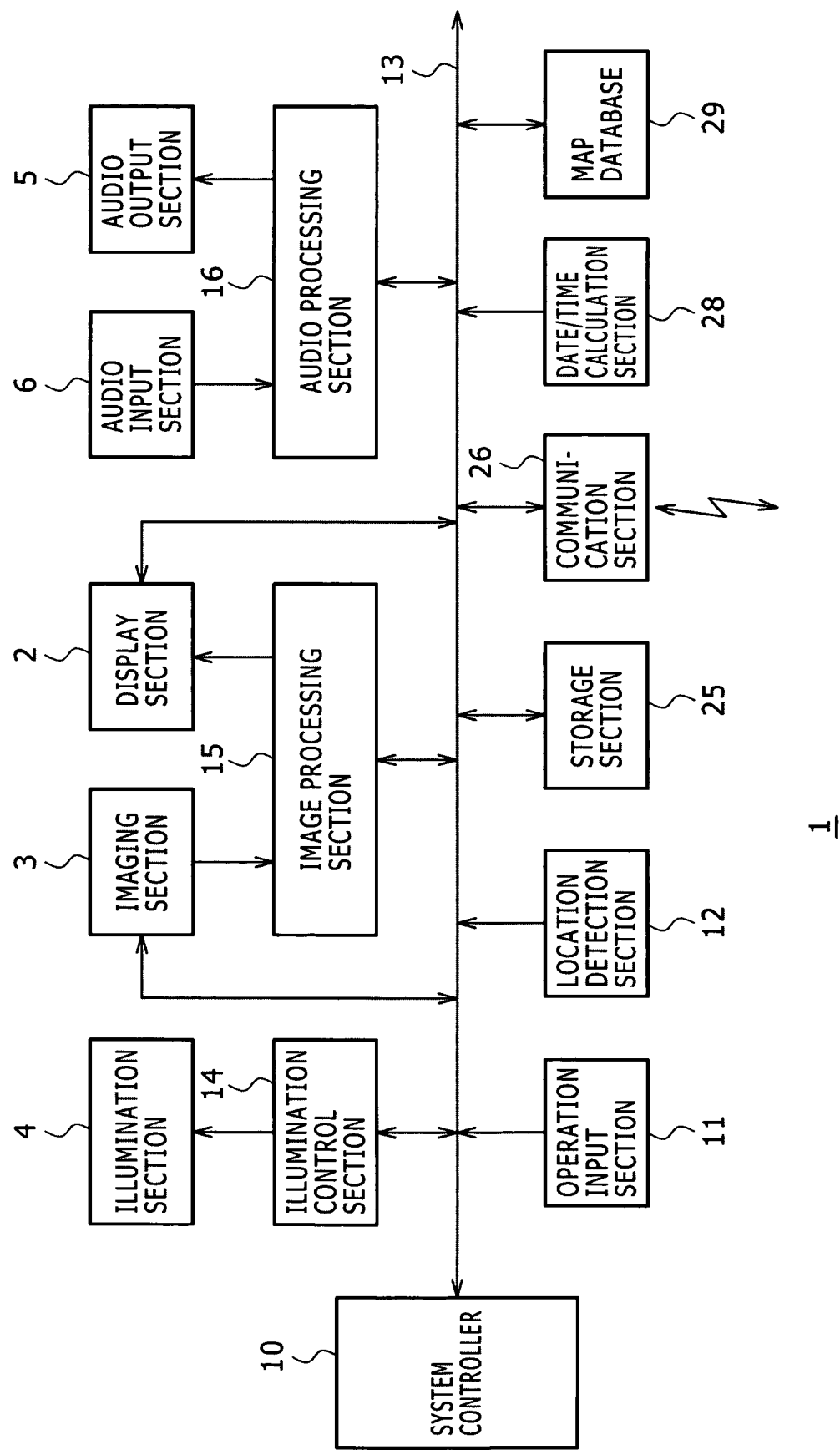
FIG. 4 is a block diagram of an imaging/display apparatus according to one embodiment of the present invention.
Figure 5:
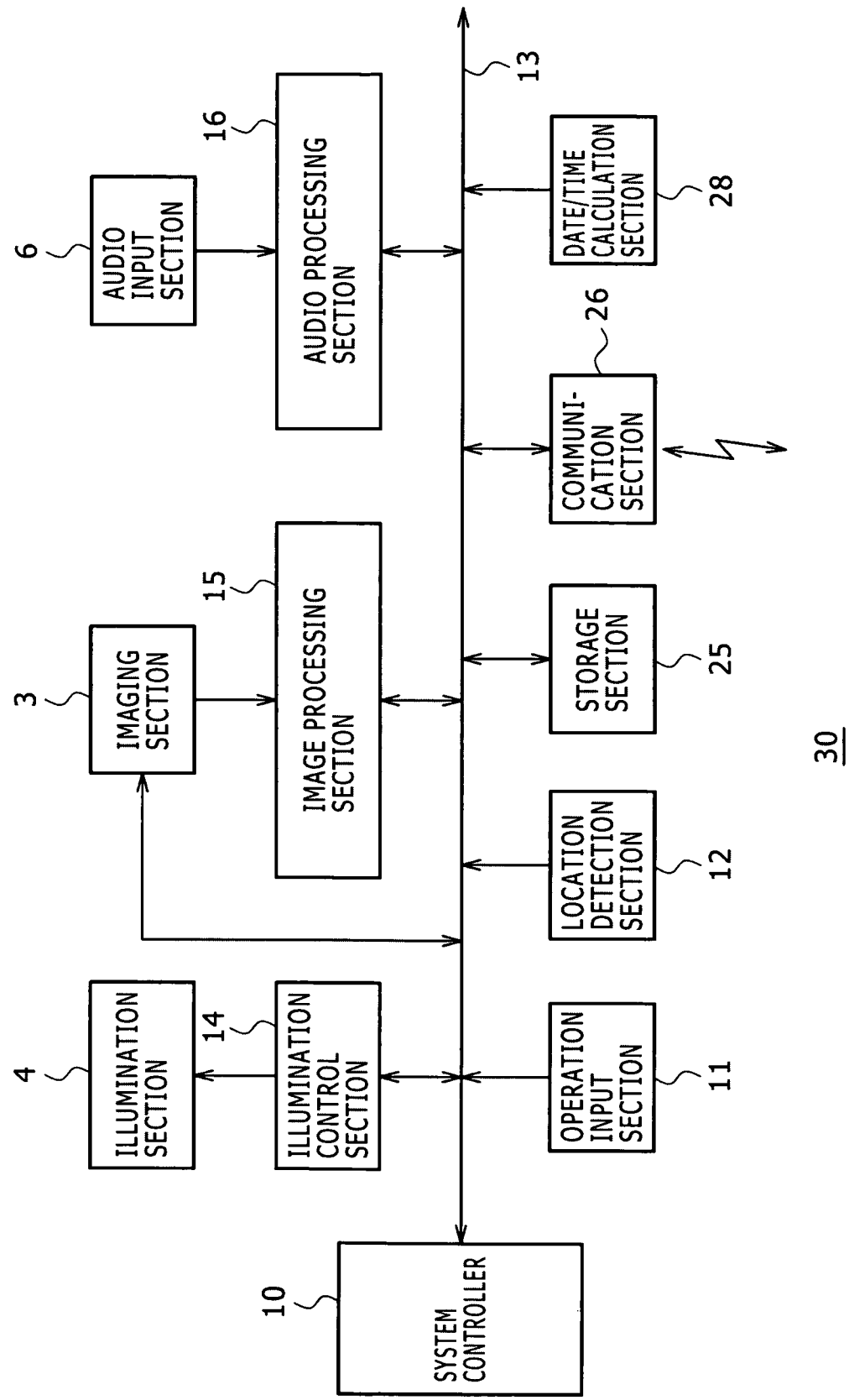
FIG. 5 is a block diagram of an imaging apparatus according to one embodiment of the present invention.

In the exemplary configuration of FIG. 7, the imaging apparatus 30 has substantially the same structure as that of the imaging/display apparatus 1 illustrated in FIG. 4, except that the imaging apparatus 30 is not provided with the display section 2 but is provided with a transmission section 27 instead.

The transmission section 27 encodes image data supplied from the image processing section 15 as image data to be displayed for monitoring so that the image data can be transmitted to the display apparatus 40. Then, the transmission section 27 transmits the encoded image data to the display apparatus 40.

The display apparatus 40 includes a reception section 41, a display control section 42, and the display section 2.

The reception section 41 performs data communication with the transmission section 21 in the imaging apparatus 30. The reception section 41 receives the image data transmitted from the imaging apparatus 30, and decodes the received image data.

The image data decoded by the reception section 41 is supplied to the display control section 42. The display control section 42 performs signal processing, screen splitting, character synthesis, or the like for presenting a display concerning the image data to generate an image signal used for the display, and supplies the generated image signal to the display section 2, which has the display panel section 2a such as the liquid crystal display.

In accordance with the image signal used for the display, the display section 2 applies driving signals based on a video signal to the pixels arranged in a matrix in the display panel section 2a with predetermined horizontal/vertical driving timing for displaying.

When the imaging apparatus 30 and the display apparatus 40 have the above configuration, the user who is wearing the imaging apparatus 30 and the display apparatus 40 like user F in FIG. 3 is able to use the two apparatuses in a manner similar to the manner in which the imaging/display apparatus 1 is used.

Figure 8:
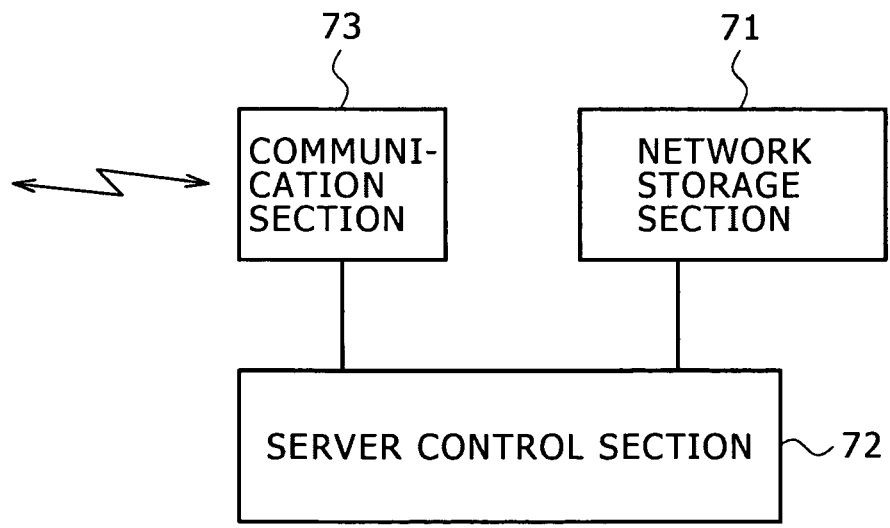
FIG. 8 is a block diagram of a server apparatus according to one embodiment of the present invention.

The exemplary structure of the server apparatus 70 will now be described below with reference to FIG. 8.

The server apparatus 70 includes a server control section 72, a network storage section 71, and a communication section 73.

The network storage section 71 is formed by an HDD or the like, and stores the point image database described below. As described below with reference to FIG. 12, the point image database is a database in which the image/audio data and the additional data received from the imaging apparatus 30 or the imaging/display apparatus 1 via the network 60 are accumulated.

The communication section 73 performs data communication with the communication section 26 of each of the imaging/display apparatus 1, the imaging apparatus 30, and the display apparatus 40 via the network 60.

The server control section 72 performs operation control necessary for the server apparatus 70. Specifically, the server control section 72 controls a communication operation performed between the imaging/display apparatus 1, the imaging apparatus 30, and the display apparatus 40, a process of storing the image/audio data in the network storage section 71, a searching process, and so on.

While the structures of the imaging/display apparatus 1, the imaging apparatus 30, the display apparatus 40, and the server apparatus 70 have been described above, it will be appreciated that each of these structures is merely an example. Needless to say, addition or omission of a component(s) is possible in a variety of manners in accordance with an actual system operation or functionality as implemented. It will be appreciated that appropriate structures of the imaging apparatus 30, the imaging/display apparatus 1, and the display apparatus 40 depend upon the type of movable body on which the imaging apparatus 30 or the imaging/display apparatus 1 is mounted (placed) or upon the form (e.g., a watch shape, a portable type, a stationary type, etc.) of the display apparatus 30.

[4. Exemplary System Operation]

Hereinafter, exemplary system operations according to the present embodiment will be described.

Designations "apparatus A" and "apparatus B" will be used in the following description.

The designation "apparatus A" refers to the imaging/display apparatus 1 or the display apparatus 40 as illustrated in FIG. 3. The designation "apparatus B" refers to the imaging/display apparatus 1 or the imaging apparatus 30 as illustrated in FIG. 3.

In other words, "apparatus A" refers to devices that are used by a user and receive and display an image taken at another movable body from the server apparatus 70, and corresponds to the "display apparatus" as recited in the appended claims.

On the other hand, "apparatus B" refers to devices that transmit images to the server apparatus 70 and are worn by or mounted on a person, a creature, a vehicle, or other movable bodies as mentioned previously, and corresponds to the "imaging apparatus" as recited in the appended claims.

Figure 9:
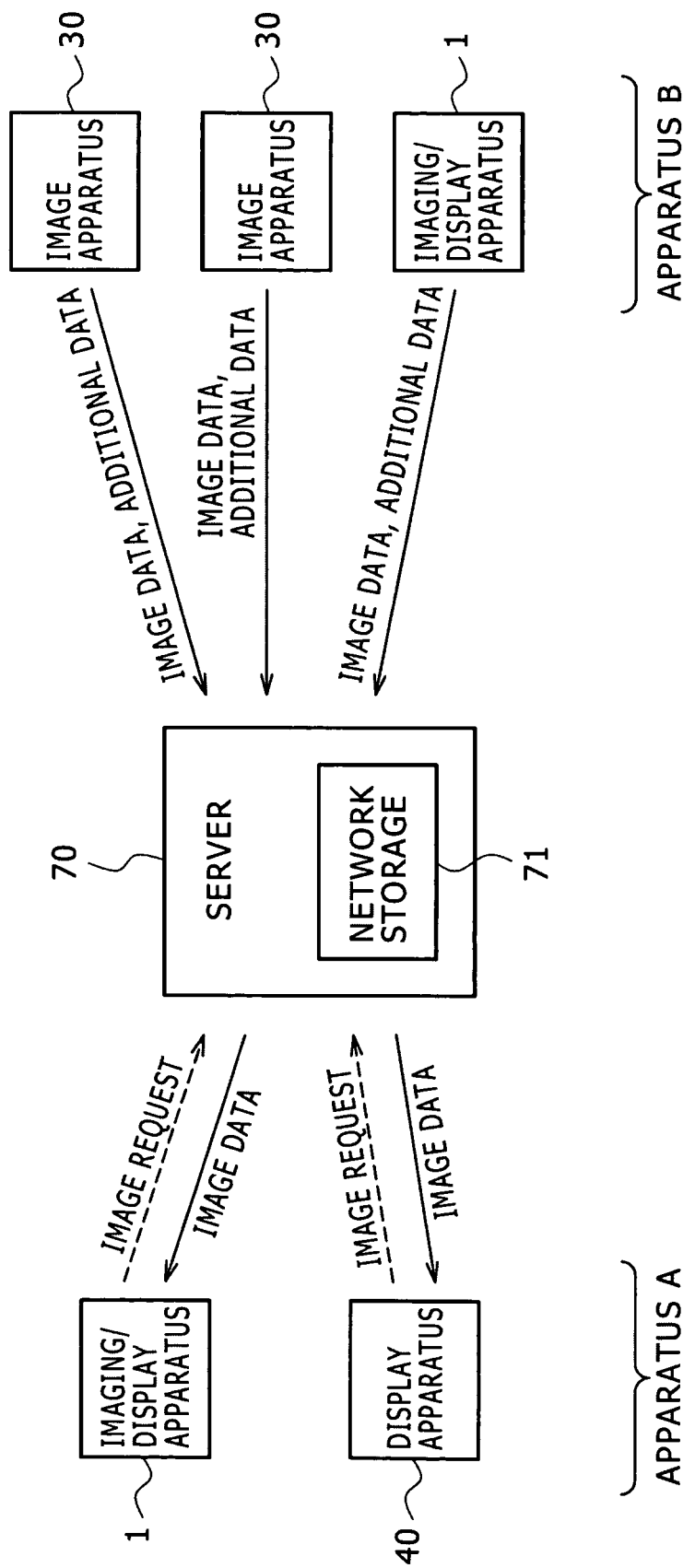
FIG. 9 is a diagram illustrating exemplary system operation according to one embodiment of the present invention.

FIG. 9 illustrates the imaging/display apparatus 1 and the display apparatus 40 which function as the apparatus A, the server apparatus 70, and the imaging/display apparatus 1 and the imaging apparatuses 30 which function as the apparatus B.

The imaging apparatuses 30 and the imaging/display apparatus 1 which function as the apparatus B perform a process of transmitting the image data obtained by imaging (and the audio data) to the server apparatus 70.

For example, the imaging apparatuses 30 and the imaging/display apparatus 1 which function as the apparatus B may constantly image and transmit the taken image data (and the audio data) to the server apparatus 70. In the case where imaging is performed only at specified times, the imaging apparatuses 30 and the imaging/display apparatus 1 which function as the apparatus B may transmit the picked-up image data (and the audio data) to the server apparatus 70 every time imaging has been performed. For example, imaging and transmission of the image data may be performed regularly. In the case of the apparatus B worn by the user, imaging and the transmission of the image data may be performed based on a user operation. Further, the server apparatus 70 may transmit to the apparatus B a request for imaging together with location information indicative of a specified location. In this case, the system controller 10 of the apparatus B may automatically take and transmit image data obtained by imaging to the server apparatus 70 when the system controller 10 has determined that the current location of the apparatus B corresponds to the specified location indicated by the location information.

As noted previously, the imaging apparatus 30 and the imaging/display apparatus 1 which function as the apparatus B also transmit the additional data when transmitting the image/audio data to the server apparatus 70.

The additional data includes image management information concerning the image/audio data transmitted, the location information indicative of the location at which the image data was obtained by imaging, and the date/time information indicative of the date and time when the image data was obtained by imaging.

The server apparatus 70 stores the image data (and the audio data) and the additional data transmitted from each of the imaging/display apparatus 1 and the imaging apparatuses 30 in the point image database in the network storage section 71.

That is, upon receipt of the image data (and the audio data) and the additional data from the apparatus B via the communication section 73, the server control section 72 performs a process of registering the received data in the point image database in the network storage section 71.

FIG. 10 schematically illustrates contents recorded in the point image database.

In the point image database, the image data transmitted from each of the imaging/display apparatuses 1 and the imaging apparatuses 30 which function as the apparatus B are segmented into and registered as entries #1, #2, and so on. Segmentation of the image data may be based on the size of the image data, a playback time, or the like. For example, a maximum data size, a maximum playback time, or the like may be determined. In the case where the image data is transmitted from the apparatus B as a continuous video, the continuous video may be divided into different entries at a point where the location information indicative of the location where the image data was obtained by photographing changes. The manner in which the image data is segmented into different entries may be determined appropriately depending on the form of the transmission of the image data from the apparatus B, or duration of transmission, or according to convenience for management information of the point image database or convenience for an image providing service provided by the server apparatus 70, for example.

Referring to FIG. 10, while image data (and audio data) VD1, VD2, VD3, and so on are recorded as entries, location information P1, P2, P3, and so on, date/time information Date1, Date2, Date3, and so on, and image management information C1, C2, C3, and so on are recorded so as to be associated with the image data VD1, VD2, VD3, and so on, respectively.

The location information, the date/time information, and the image management information are the additional data transmitted from the apparatus B together with the image data.

For example, regarding the entry #1, the location information P1 is location information indicative of a location where an image of the image data VD1 was taken, and is, for example, information of the latitude and longitude of that location.

The date/time information Date1 is information indicative of a date and time (year, month, day, hour, minute, second) when the image of the image data VD1 was taken.

The image management information C1 is management information of the image data VD1, and includes, for example, an image type (video or still images, for example), a data size, a compression algorithm, the identification information of the apparatus B, and imaging location-related information such as information of a name of the location where the image of the image data VD1 was taken. Note that the imaging location-related information may be retrieved from the map database 29 in the imaging/display apparatus 1 or imaging apparatus 30 that functions as the apparatus B based on the current location information at the time of imaging, and then the system controller 10 of the apparatus B may add the retrieved imaging location-related information to the additional data to be transmitted to the server apparatus 70. Alternatively, the server apparatus 70 may be provided with a map database and retrieve the imaging location-related information from the map database 75 based on the location information P1.

As described above, each of the imaging/display apparatuses 1 and the imaging apparatuses 30 that function as the apparatus B transmits the image data and the additional data to the server apparatus 70 as illustrated in FIG. 9. As a result, the image data of the images taken at a variety of places and at a variety of speeds is accumulated in the point image database as illustrated in FIG. 10.

As a result of the accumulation of the images taken at a variety of places and at a variety of speeds in the server apparatus 70, the server apparatus 70 becomes able to provide the image providing service to the user of the apparatus A. That is, the server apparatus 70 is capable of reading the image data accumulated in the point image database and transmitting the read image data to the apparatus A in response to the image request from the apparatus A.

An exemplary operation in which the imaging/display apparatus 1 or display apparatus 40 that functions as the apparatus A communicates with the server apparatus 70 and acquires the image data from the server apparatus 70 to display the acquired image data will now be described below. In other words, this exemplary operation is an operation in which the user of the apparatus A enjoys the image providing service provided by the server apparatus 70.

Figure 11:
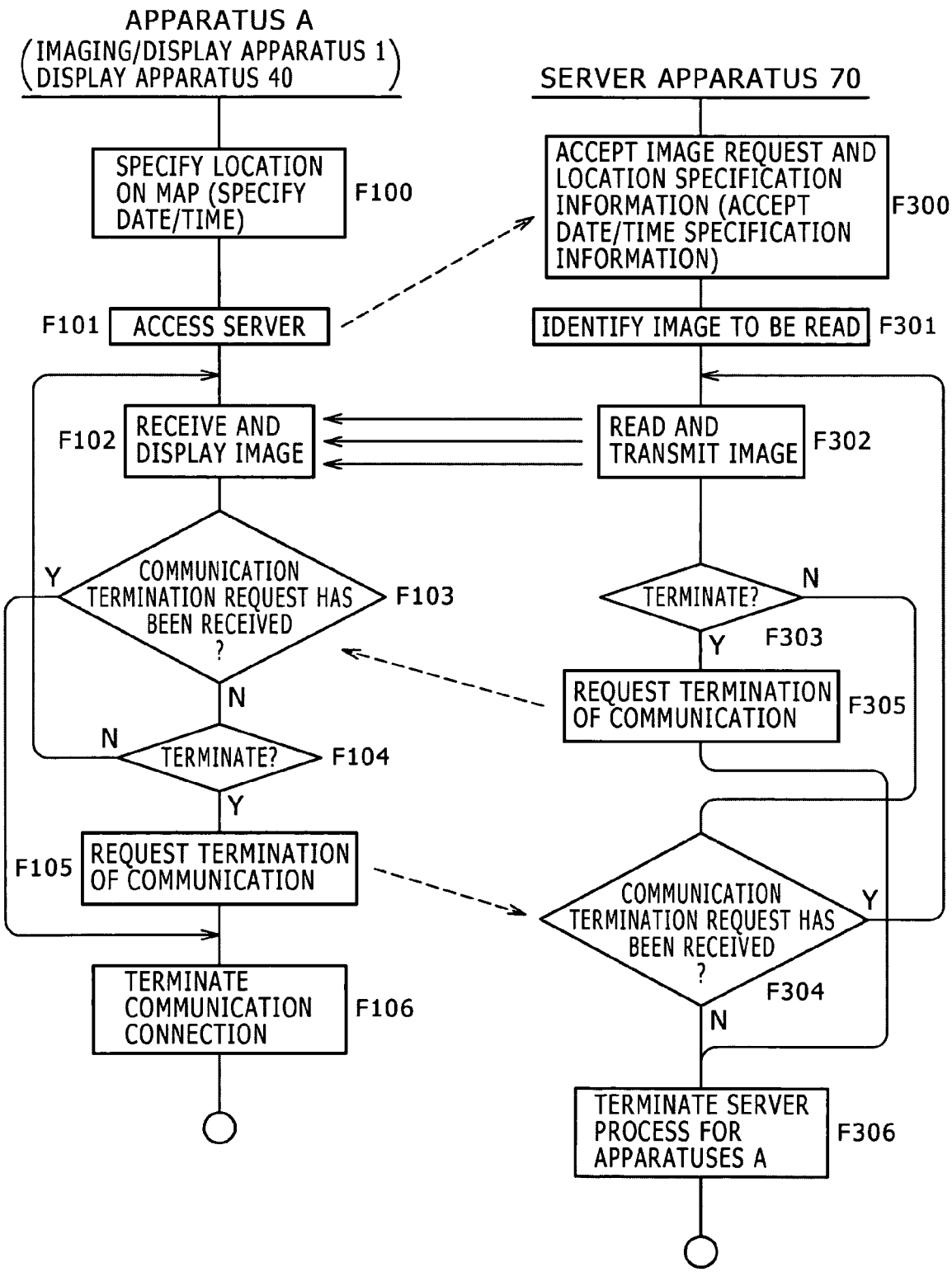
FIG. 11 is a flowchart of exemplary system operation according to one embodiment of the present invention.

A procedure of the apparatus A illustrated in FIG. 11 can be considered as a control procedure performed by the system controller 10 of the imaging/display apparatus 1 or the display apparatus 40, whereas a procedure of the server apparatus 70 can be considered as a control procedure performed by the server control section 72.

On the part of the apparatus A, first at step F100, a location specification process is performed using the map image. For example, the system controller 10 of the apparatus A performs map display using data in the map database 29. It also performs a search for a specific area on the map, scrolling display, or the like in accordance with a user operation. This enables the user to see the map image of a specific region or area on the display section 2.

Figure 12:
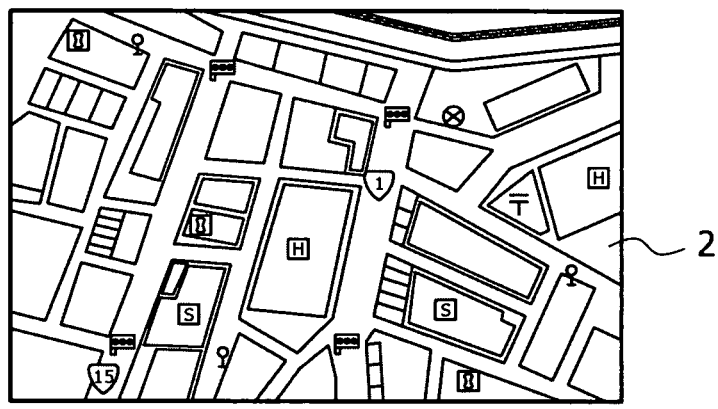
FIG. 12 is an illustration of image used when specifying by using a map image in one embodiment of the present invention.
Figure 12:
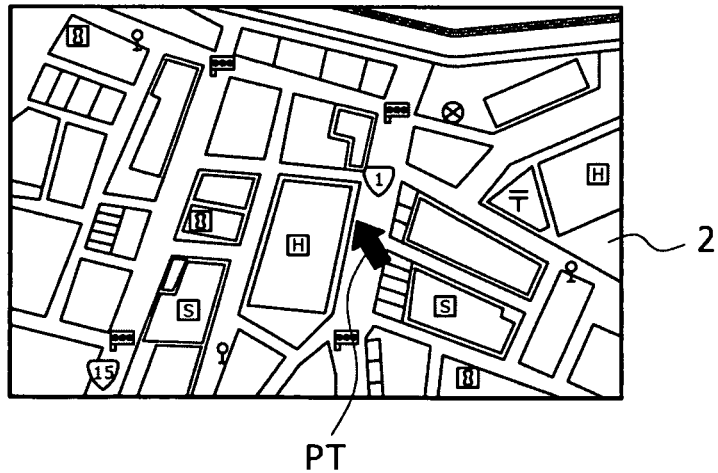

For example, in response to the user's specifying a place name or a scale or performing a scrolling operation, the system controller 10 changes the area being displayed or the scale to cause the map image of a certain area to be displayed as illustrated in (a) of FIG. 12, for example.

The system controller 10 causes a pointer PT to be displayed on the map image as illustrated in (b) of FIG. 12, for example, and allows the pointer PT to be moved on the map image in accordance with the user operation. That is, by moving the pointer PT to a desired location on the map image and performing a predetermined operation, the user is able to specify a specific location on the map image.

Note that the use of the pointer PT is not essential, needless to say. For example, a touch panel operation feature may be added to the display section 2, so that the user can specify a desired location by touching that location on the map image with a finger.

In response to the user's performing the operation of specifying a certain point on the map image in such a manner, the system controller 10 generates the location specification information. In other words, it generates the location specification information including values of a latitude and longitude of the point specified by the user on the map.

After generating the location specification information at step F100, the system controller 10 of the apparatus A accesses the server apparatus 70 at step F101. In other words, the system controller 10 of the apparatus A establishes the communication connection with the server apparatus 70. At this time, the system controller 10 of the apparatus A transmits the information of the image request, and the location specification information to the server apparatus 70.

At step F300, the server control section 72 of the server apparatus 70 establishes the communication connection with the apparatus A, and accepts the image request, and the location specification information.

Then, at step F301, the server control section 72 identifies image data to be read. Specifically, based on the received location specification information, the server control section 72 searches the point image database in the network storage section 71 to extract an entry whose location information matches the location specification information.

Alternatively, an entry may be extracted that has location information within a predetermined range that can be considered as being close to the location in the latitude and longitude specified by the location specification information.

Then, the server control section 72 identifies the image data of the extracted entry as the image data to be read.

Also note that a plurality of entries may be found. In this case, the date/time information may be referred to so that image data of an entry whose date/time information indicates the most recent date and time is selected as the image data to be read. Alternatively, all of the entries found may be determined to be read sequentially.

Also note that no entry that matches the location specification information may be found. That is, in the case where no image data of an image taken at (or near) the location indicated by the location specification information has been uploaded by the apparatus B.

Although not shown in FIG. 11, in such a case, the server control section 72 notifies the apparatus A that no image data that matches the location specification information has been found and, therefore, providing of an image is impossible. In response thereto, the apparatus A informs the user of the impossibility of the providing of an image, and finishes its procedure.

After searching the point image database and identifying the entry (i.e., the image data) to be read, the server control section 72, at step F302, causes the image data identified as the image to be read to be read from the network storage section 71, and causes the read image data and audio data to be transmitted to the apparatus A via the communication section 73.

At step F102, the apparatus A receives and displays the image data transmitted from the server apparatus 70. That is, the system controller 10 of the apparatus A causes the image data (and the audio data) received and demodulated by the communication section 26 to be supplied to the image processing section 15 and the audio processing section 16, and causes the image data to be displayed on the display section 2 and the audio data to be outputted via the audio output section 5.

At step F103, the system controller 10 of the apparatus A monitors whether or not the communication termination request has been transmitted from the server apparatus 70.

At step F104, the system controller 10 of the apparatus A determines whether or not the displaying of the image should be terminated. For example, the system controller 10 of the apparatus A determines that the displaying of the image should be terminated when the user has performed the operation for terminating the displaying of the image using the operation input section 11. Also, the displaying of the image may be automatically terminated when the reception and displaying of the image data has continued for a predetermined period of time.

The system controller 10 of the apparatus A continues to display the image data (and output the audio data) received at step F102 until it is determined at step F103 that the communication termination request has been received or it is determined at step F104 that the displaying of the image should be terminated.

At step F303, the server apparatus 70 monitors whether the reading of the image data of the entry to be read has been completed. At step F304, the server apparatus 70 monitors whether the communication termination request has been received from the apparatus A. The server apparatus 70 continues to read and transmit the image data (and the audio data) until either of such cases are determined.

Therefore, during this period, the user of the apparatus A is able to watch an image of an actual scene that was taken in the past by the apparatus B that was located at or near the location specified by the user using the map image and was moving at the specified speed.

If it is determined at step F104 that the displaying of the image should be terminated based on the user operation or another condition for termination, the system controller 10 of the apparatus A proceeds to step F105, and causes the communication termination request to be transmitted to the server apparatus 70 via the communication section 26, and then proceeds to step F106. Upon receipt of the communication termination request, the server apparatus 70 proceeds from step F304 to F306.

If it is determined that the reading and transmission of the entry to be read has been completed, the server control section 72 proceeds from step F303 to F305, and causes the communication termination request to be transmitted to the apparatus A via the communication section 73. Upon receipt of the communication termination request, the system controller 10 of the apparatus A proceeds from step F103 to F106.

Then, at step F106, the system controller 10 of the apparatus A performs a process of terminating the communication connection with the server apparatus 70. At step F306, the server control section 72 of the server apparatus 70 terminates the communication with and the server process for the apparatus A. Thus, the system operation is finished.

According to the above-described procedures, by specifying a certain location arbitrarily on the map image, the user of the apparatus A is able to watch the scene photographed by the apparatus B at that location, with the apparatus A which the user is wearing or carrying.

Figure 13:
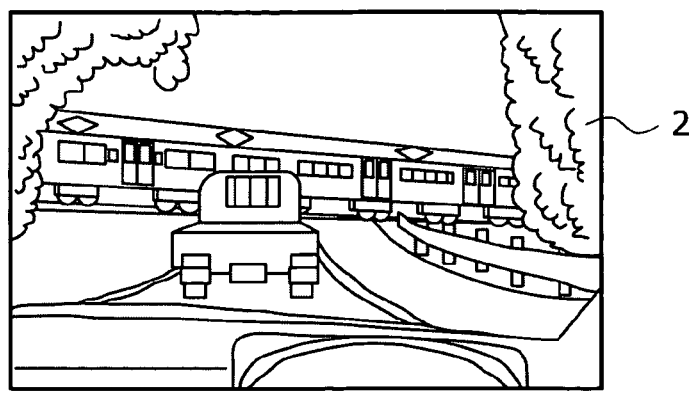
FIG. 13 is an illustration of taken image of the specified point to be displayed in one embodiment of the present invention.
Figure 13:
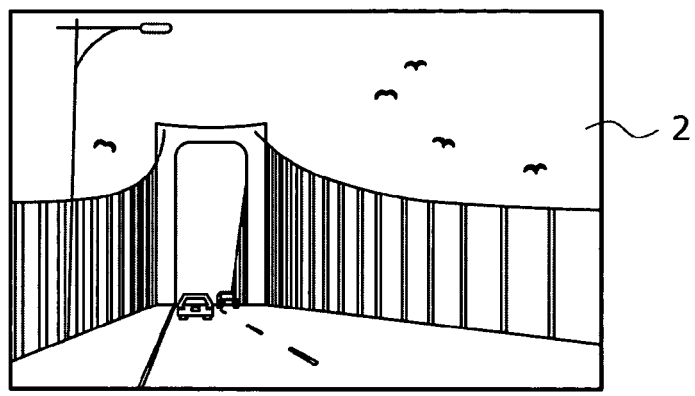
Figure 13:
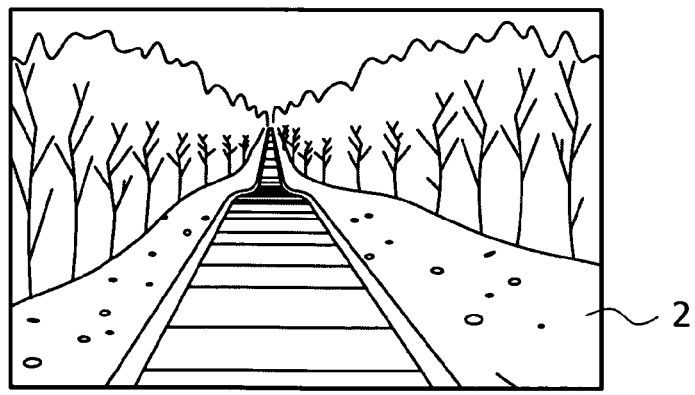
Figure 13:
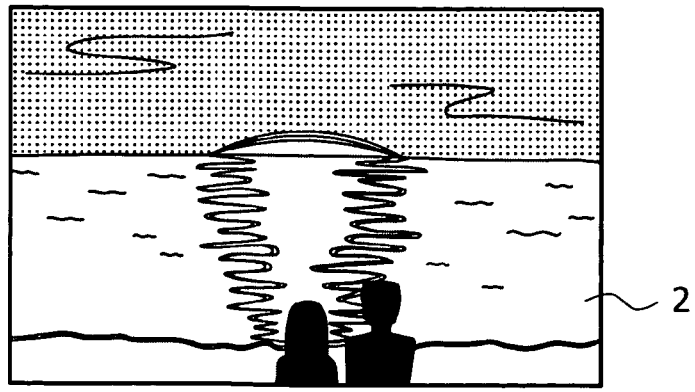

FIG. 13 illustrates exemplary images that can be seen by the user of the apparatus A.

If the user of the apparatus A specifies a point on a certain road on the map, for example, the user can see an image shot at that point in the past with the apparatus B, as illustrated in (a) and (b) of FIG. 13. Such images are, for example, images that had been shot at that specified point by the imaging apparatus 30 attached to, for example, the automobile, or the imaging apparatus 30 or the imaging/display apparatus 1 worn by a driver.

Referring to (c) of FIG. 13, if the user of the apparatus A specifies a point on a certain railway track on the map, for example, the user can see an image shot by the apparatus B such as the imaging apparatus 30 attached to a railway vehicle at that point in the past, or the imaging apparatus 30 or imaging/display apparatus 1 that was worn by a train driver.

Referring to (d) of FIG. 13, if the user of the apparatus A specifies a point in a certain resort on the map, for example, the user can see an image shot by the apparatus B such as the imaging apparatus 30 or imaging/display apparatus 1 that was worn by a person who was present at that point in the past.

As in the above examples, for example, by specifying a point on the map, the user of the apparatus A can see an image that was actually shot at that point.

While it has been assumed in the foregoing description that the user of the apparatus A specifies only the location on the map image, the user may be allowed to additionally specify a date and time as additionally described in step F100 in FIG. 11.

As described above, at step F100, the system controller 10 generates the location specification information in accordance with the user's operation of specifying the location while the map image is being displayed. At this time, the system controller 10 may additionally ask the user to specify and enter the date and time either using a menu or by inputting a numerical value, for example.

For example, the user may be allowed to specify and enter a specific year, month, and day, a specific time, or the like, or to specify and enter a certain date range (e.g., from a certain day of a certain month to a certain day of a certain month) or a certain time range (e.g., from a certain hour to another hour). Further, the user may be allowed to select a search condition based on the entered date and time. Examples of such search conditions include "including the specified date/time," "within the specified date/time range," "before the specified date/time," and "after the specified date/time." Then, the system controller 10 sets the specified date/time or a combination of the specified date/time and the search condition as date/time specification information.

In this case, when accessing the server apparatus 70 at step F101, the system controller 10 of the apparatus A transmits the date/time specification information as well as the location specification information. At step F300, the server control section 72 accepts the date/time specification information as well as the location specification information.

Then, at step F301, the server control section 72 searches the point image database using both the location specification information and the date/time specification information.

Specifically, the server control section 72 extracts entries whose location information in the point image database match (or are close to) the location specification information, and further extracts therefrom an entry whose date/time information in the point image database matches the date/time specification information.

By performing a search in the above-described manner, the server control section 72 extracts an entry that matches the location and imaging date/time specified by the user, and identifies image data of that entry as the image to be read.

As described above, by specifying the date/time, the user of the apparatus A is able to selectively watch an image taken at the specified date/time.

For example, the user of the apparatus A is able to arbitrarily select and watch a scene taken at a certain point in a certain period, a scene taken at a certain point in the recent past, a scene taken at a certain point before a certain time, a scene taken at a certain point on a specific day, a scene taken at a certain point at a specific time, a scene taken at a certain point at night, or the like.

Thus, the user is able to watch a greater variety of scenes taken at an arbitrary place at an arbitrary moving speed.

[5. Effects of Embodiments, Exemplary Variants, and Exemplary Expansions]

Embodiments have been described above. The user of the imaging/display apparatus 1 or display apparatus 40 corresponding to the apparatus A is able to see, by specifying a location on the map image, an image actually shot by the imaging apparatus 30 at the specified location. Thus, a system and apparatus that satisfy a variety of needs of users are achieved. Examples of such needs include a desire to watch and enjoy a scene at a certain place that can be specified on the map, and a desire to know a situation of a certain place that can be specified on the map.

Further, the ability to specify a location on the map image and see an image shot at that location allows the user to know, as circumstances of the specified location, a geographic feature thereof, a view of a nearby building or natural object, the width of a road or the number of lanes, a state that varies depending on the date and time, or the like, for example. Thus, application to a so-called navigation system makes it possible to provide an expansive information providing service.

Still further, the date/time specification information can be used to select image data to be provided. This allows the user to watch different images by specifying different date/time conditions.

For example, that makes it possible to watch, as an image shot at a certain place at a time earlier than a certain period, a scene of that place before a certain building was built by specifying it.

Since the imaging/display apparatuses 1 or imaging apparatuses 30 that function as the apparatus B can be placed on the movable bodies including people, there is no need to provide fixed equipment such as a so-called fixed camera.

The imaging/display apparatuses 1 or imaging apparatuses 30 placed on the movable bodies naturally take images while traveling over a variety of places. Therefore, it is easy to collect images actually taken at a variety of places and enrich the images registered in the point image database.

While embodiments of the image display system, the display apparatus, and the display method according to the present invention have been described above, it will be appreciated that the present invention is not limited to the above-described embodiments but that there are a variety of variants and expansions.

There are a variety of possible structures and procedures of the imaging/display apparatus 1 and display apparatus 40 that function as the apparatus A, which corresponds to the display apparatus according to the present invention. Also, there are a variety of possible structures and procedures of the imaging/ display apparatus 1 and imaging apparatus 30 that function as the apparatus B, which corresponds to the imaging apparatus as recited in the appended claims. Also, there are a variety of possible structures and procedures of the server apparatus 70.

Still further, for example, not only normal imaging but also a variety of imaging operations may be performed to obtain images in the apparatus B so that the uploaded data is transmitted to the server apparatus 70. Also, a request for a variety of imaging operations may be transmitted from the server apparatus 70. Examples of such a variety of imaging operations include: telephoto imaging; wide-angle imaging; imaging that involves zooming in or zooming out within a range between a telephoto extreme and a wide-angle extreme; imaging for a magnified image; imaging for a reduced image; imaging with a varied frame rate (e.g., imaging with a high frame rate, imaging with a low frame rate, etc.); imaging with increased brightness; imaging with reduced brightness; imaging with varied contrast; imaging with varied sharpness; imaging with increased imaging sensitivity; imaging with increased infrared imaging sensitivity; imaging with increased ultraviolet imaging sensitivity; imaging with a specific wavelength range cut off; imaging that involves application of an image effect, such as mosaicing for the picked-up image data, a brightness reversing process, a soft-focus process, highlighting a part of the image, or varying overall color atmosphere of the image; and imaging for a still image.

Still further, when the apparatus A requests an image from the server apparatus 70, it may be so arranged that not only a normal playback image of an image registered in the point image database but also a special playback image thereof may be requested.

For example, a request for transmission of a still image, corresponding to only one frame, of a piece of image data that is stored as a video may be possible, and a request for image data played at a reduced speed or an increased speed may be possible.

In particular, image data registered in the point image database, since they are image data shot by the apparatus B as attached to a movable body, are often image data that were shot while the movable body was traveling at a certain speed. Accordingly, the server apparatus 70 may reproduce such image data at a varied speed to transmit it to the apparatus A, so that the user of the apparatus A can see an image of a scene that would be seen when traveling at a high speed, an image of a scene that would be seen when traveling at a slow speed, or the like, artificially.

Still further, in the apparatus A, the image data transmitted from the server apparatus 70 may be stored in the storage section 25 with location information. That is, the system controller 10 stores the received image data in the storage section 25 so as to be associated the location information (e.g., the point specification information set at step F100 in FIG. 11).

As a result, the user can replay the image data stored in the storage section 25 by specifying the same point on the map at any subsequent time.

Still further, the user of the apparatus A may be allowed to specify a direction of movement from a certain point.

In this case, in the apparatus B, the location detection section 12 detects the direction of movement as well, and the direction of movement is transmitted to the server apparatus 70 included in the additional data. The server apparatus 70 registers the received data in the point image database together with the movement direction information.

Thus, by specifying a direction of movement as an additional search condition, the user of the apparatus A is able to request the server apparatus 70 to select image data of an image taken by an apparatus B moving in the specified direction of movement.

For example, scenes seen on a certain road that runs in a north-south direction will differ depending on whether the apparatus B imaging the scenes are moving northward or southward. When the user of the apparatus A specifies the direction of movement as an additional search condition, image data that matches the user-specified direction of movement will be retrieved and provided to the apparatus A.

In the examples described above, it has been assumed that the location specification is performed on a ground map image. However, a certain location may be specified via an ocean chart, an undersea topographic map, an aeronautical chart, a space chart, or the like.

For example, the server apparatus 70 may register image data of images shot at a watercraft, a submarine, an aircraft, a satellite, and so on in the point image database together with the location information thereof, and so on. In this case, the server apparatus 70 is able to search for an appropriate image based on the specification via the ocean chart or the like, and provide the image found to the apparatus A. It will be appreciated that location information concerning a location beneath the sea, in the air, in space, or the like may include not only information of the latitude and longitude but also information of an altitude or a depth.

For example, the user may specify a certain place on an orbit of the satellite using the space chart to watch an image shot at the satellite at that point or near that point.

Further, in the exemplary operation according to the above embodiment, the apparatus A side is provided with the map database 29 to perform the map display. However, the server apparatus 70 may be provided with a map database, and the server apparatus 70 may transmit a map image based on the map database to allow it to be displayed at the apparatus A.

For example, the user of the apparatus A enters a specific place name, address, or the like, and transmits the place name, address, or the like to the server apparatus 70, as the location specification information. Then, the server apparatus 70 generates map image data that should be displayed based on the place name or the like, and transmits it to the apparatus A to be displayed.

This eliminates the need for the apparatus A side to be provided with the map database 29. In other words, an operation according to the present invention can also be accomplished even in the imaging/display apparatus 1 or display apparatus 40 that is not equipped with the map database 29.

It has been assumed in the above-described embodiments that the image data and the audio data are uploaded to the server apparatus 70 from the apparatus B and provided to the apparatus A from the server apparatus 70. Note, however, that only the image data may be provided in another embodiment of the present invention.

Also note that the present invention may be applied to a system that handles only the audio data.

The invention claimed is:
1. An image display system comprising:
a display apparatus configured to be worn on an arm of a user;
an imaging apparatus configured to be worn on a head of a user or attached to a vehicle for photographing; and
a server apparatus,
wherein:
each of said display apparatus and said imaging apparatus is configured to communicate with said server apparatus, said imaging apparatus includes:
   an imaging section that performs photographing,
   a location detection section that detects location information, and
   a first controller that performs a transmission control process of causing image data obtained by the photographing by the imaging section and additional data that includes at least the location information detected by the location detection section when the image data was obtained by the photographing to be transmitted to said server apparatus;

said server apparatus includes:
   a network storage section for storing the image data and the additional data transmitted from said imaging apparatus, and
   a server control section that performs a search/transmission control process of searching through the image data stored in the network storage section based on location specification information transmitted from said display apparatus, and causing image data found to be read and transmitted to said display apparatus; and said display apparatus includes:
   a display section that performs image display, and
   a second controller that performs a map display process of causing the display section to display a map image, a location specification process of setting the location specification information based on an input specifying a position on the map image, an image request transmission process of transmitting the location specification information to said server apparatus to make a request for the image data, and a display process of receiving the image data transmitted from said server apparatus in response to the image request transmission process and causing the display section to perform a display operation based on the received image data.

2. The image display system according to claim 1, wherein: said imaging apparatus further includes a date/time detection section for detecting a current date and time and generating date/time information indicative of the current date and time detected, and the first controller of said imaging apparatus allows the additional data to include the date/time information generated by the date/time detection section when the image data was taken; the second controller of said display apparatus performs a date/time specification process of setting date/time specification information for specifying a date and time, and, in the image request transmission process, transmits point specification information and the date/time specification information to said server apparatus; and
in the search/transmission control process, the second control section searches through the image data stored in the network storage section based on the point specification information and the date/time specification information transmitted from said display apparatus.

3. The image display system according to claim 2, wherein, in a case where a plurality of pieces of image data have been received from said server apparatus, the second controller of said display section causes the display section to display the plurality of pieces of image data based on the date/time information of the plurality of pieces of image data.

4. The image display system according to claim 1, wherein:
   said server apparatus includes a communication section that transmits photographing request data specifying the location information; and
   the first controller of said imaging apparatus causes the imaging section to photograph, if a current location of said imaging apparatus is determined to coincide with the location specified by the photographing request data.

5. The image display system according to claim 1, wherein, if a current location of said imaging apparatus is determined to coincide with a location specified by photographing request data, the first controller of said imaging apparatus causes the image data obtained by the photographing by the imaging section and the additional data that includes at least the location information detected by the location detection section when the image data was obtained by the photographing to be transmitted to said server apparatus.

6. The image display system according to claim 1, wherein, in a case where a plurality of pieces of image data have been received from said server apparatus, the second controller of said display section causes the display section to display the plurality of pieces of image data in an order in which the plurality of pieces of image data were uploaded to said server apparatus.

7. The image display system according to claim 1, wherein:
   the display section is further configured to receive touch input from a user; and
   the input specifying a position on the map image comprises touch input to the display section.

* * * * *